United States Patent [19]
Masuda et al.

[11] Patent Number: 5,732,249
[45] Date of Patent: Mar. 24, 1998

[54] CLOCK DISTRIBUTING CIRCUIT

[75] Inventors: Shinichi Masuda; Kazuya Ishihara, both of Tokyo, Japan

[73] Assignees: Mitsubishi Electric Engineering Co., Ltd.; Mitsubishi Denki Kabushiki Kaisha, both of Tokyo, Japan

[21] Appl. No.: 578,432

[22] Filed: Dec. 26, 1995

[30] Foreign Application Priority Data

Jul. 26, 1995 [JP] Japan ................................. 7-190584

[51] Int. Cl.⁶ ........................................................ G06F 1/04
[52] U.S. Cl. ............................... 395/558; 395/555; 326/93
[58] Field of Search ............................... 395/555, 558; 307/409; 326/93, 101; 327/291, 293, 297

[56] References Cited

U.S. PATENT DOCUMENTS

| | | | |
|---|---|---|---|
| 5,481,209 | 1/1996 | Lim et al. | 326/93 |
| 5,668,484 | 9/1997 | Nomura | 326/93 |

OTHER PUBLICATIONS

Proc. IEEE Conference on Computer Aided Design, pp. 336–339, 1991, Ren–Song Tsay, "Exact Zero Skew".

Proc. IEEE ICCD, pp. 118–122, Oct. 1986, H.B. Bakoglu, et al., "A Symmetric Clock–Distribution Tree and Optimized High–Speed Interconnections for Reduced Clock Skew in ULSI and WSI Circuits".

Primary Examiner—Dennis M. Butler
Attorney, Agent, or Firm—Oblon, Spivak, McClelland, Maier & Neustadt, P.C.

[57] ABSTRACT

To improve the clock delay time and skew. A first resistance body (R1) and a second resistance body (R2) are provided at a terminal end node (N5) of a clock trunk line (1) composed of a doped polysilicon film or the like. Their elements (R1), (R2) are composed of the same film as the clock trunk line (1). Their resistance ratio is set so that the clamp level may be an inverted threshold of first and second local drivers (D2, D3), and the resistance values of both resistance bodies (R1, R2), and the value of interconnection resistance (R) of the clock trunk line (1) are set so that an amplitude of a clock signal at each of the nodes (N3, N4, N5) may be a potential corresponding to ½ of its peak-to-peak voltage at the same time. The amplitude of the clock signal from a start end node (N3) to a terminal end node (N5) decreases, and the delay time from an output of a clock driver (D1) to outputs of the local drivers (D2, D3) shaped in waveform is much shorter, and hence the clock skew of the outputs hardly occurs.

25 Claims, 13 Drawing Sheets

D2, D3

CLOCK DISTRIBUTING CIRCUIT

BACKGROUND OF THE INVENTION

1. Field of the Invention

The present invention relates to a clock distributing circuit in a semiconductor integrated circuit.

2. Description of the Background Art

A prior art is described below by referring to FIG. 32.

FIG. 32 is a block diagram showing an example of the prior art of a clock distributing circuit. As shown in the diagram, a conventional clock distributing circuit provided in a semiconductor integrated circuit consists of a clock driver D1P for receiving a source clock signal at its input node N1P and outputting a clock signal from its output node N2P, a clock trunk line 1P as a interconnection layer for distributing the clock signal outputted from the clock driver D1P, and plural local drivers D2P each of which receives a signal from the clock trunk line 1P to give a clock signal to a corresponding one of plural logic blocks. Incidentally, the output node N2P corresponds to a start end node of the clock trunk line 1P.

As a manufacturing process of the clock distributing circuit in this prior art, the same process as in the semiconductor integrated circuit, that is, the CMOS process is employed.

The clock driver D1P and each local driver D2P are usually composed by serial connection of plural stages of complementary type inverters consisting of a P channel transistor and an N channel transistor.

The clock trunk line 1P in the semiconductor integrated circuit is mostly wired by a material such as doped polysilicon or aluminum. At this time, an intrinsic resistance by the interconnection material, that is, a interconnection resistance is formed in the clock trunk line 1P (FIG. 32). At the same time, between the clock trunk line 1P and a substrate of the semiconductor integrated circuit, or between the clock trunk line 1P and its adjacent lines, a floating capacitance, that is, an interconnection capacitance is formed. This situation may be indicated by an equivalent circuit as shown in FIG. 33 on the clock trunk line 1P. By the interconnection resistance R and the interconnection capacitance C on the clock trunk line 1P, the rise characteristic and fall characteristic of the clock signal transmitted on the clock trunk line 1P are lowered, and a delay is caused between the source clock signal and the clock signal. Still more, the degree of slope of the rise characteristic and fall characteristic of the clock signal, that is, the waveform dullness of the clock signal differs depending on the position on the clock trunk line 1P.

FIG. 34 to FIG. 36 show transient waveforms of the clock signal at each node of the clock trunk line 1P shown in FIG. 32. Specifically, FIG. 34 shows the waveform CN1P of the source clock signal entered into the input node N1P of the clock driver D1P. FIG. 35 shows each transient waveform of the clock signal at each node of the clock trunk line 1P, that is, the start end node N2P, an intermediate node N4P, and a terminal end node N5P. In the diagram, the transient waveform CN2P is a node waveform right after an output of the clock driver D1P, corresponding therefore to a clock waveform at the start end node N2P. The transient waveform CN5P shows a clock waveform at the terminal end node N5P remotest from the clock driver D1P. Furthermore, the transient waveform CN4P shows a clock waveform at the intermediate node located between the start end node N2P and the terminal end node N5P.

At the start end node N2P, the total value of the interconnection resistance is small, but the load capacitance of the entire clock trunk line 1P is added, and hence the transient response of the clock signal at the start end node N2P is dull as compared with that of the source clock signal. On the other hand, at the terminal end node N5P, as a result of influence of the interconnection resistance and the interconnection capacitance formed on the clock trunk line 1P from the start end node N2P to the terminal end node N5P, the transient waveform is dullest, and the longest propagation time is required for the clock signal. At the intermediate node N4P, its clock waveform is a transient waveform corresponding to the middle of that of the start end node N2P and that of the terminal end node N5P.

Time t1P shows the rise start time of the source clock signal at the input node N1P, and time t2P denotes the rise start time of the clock signal at each node N2P, N4P, N5P.

At the intermediate node N4P and the terminal end node N5P, the clock signal is shaped in waveform by the corresponding local driver D2P. The clock waveform CN6P in FIG. 36 is a waveform after shaping of the clock signal at the intermediate node N4P on the clock trunk line 1P, and the clock waveform CN7P is a waveform after shaping of the clock signal at the terminal end node N5P on the clock trunk line 1P.

As shown in the same diagram, by waveform shaping by each local driver D2P, indeed, the rise and fall of the clock waveform become sharp, but each clock signal at an output node N6P of the local driver D2P causes a delay to the clock signal at the start end node N2P. The clock delay at this time corresponds to (t3P–t2P). Still more, at an output node N7P of the local driver D2P connected to the terminal end node N5P, the clock delay is further increased. The clock delay at this time corresponds to (t4P–t2P). Accordingly, between the clock signals of both output nodes N6P, N7P, a clock skew occurs. The clock skew at this time corresponds to (t4P–t3P).

SUMMARY OF THE INVENTION

A first aspect of the present invention relates to a clock distributing circuit comprising a clock driver for receiving a source clock signal and outputting a clock signal, a clock trunk line of which a start end node is connected to an output node of the clock driver, the clock trunk line being formed of a material having a resistance component, a first local driver of which an input is connected to a terminal end node of the clock trunk line, a second local driver of which an input node is connected to an intermediate node located between the start end node and the terminal end node of the clock trunk line, a first resistance body of which one end is connected to the terminal end node and other end is connected to a supply potential node, and a second resistance body of which one end is connected to the terminal end node and other end is connected to a ground node, wherein the first and second local drivers have a same inverted threshold, a resistance ratio of the first resistance body and the second resistance body is set so that a potential corresponding to ½ of a peak-to-peak voltage of an amplitude of the clock signal at the terminal end node may be the inverted threshold, and a resistance value of the resistance component of the clock trunk line, and both resistance values of the first and second resistance bodies are set so that the potential corresponding to ½ of the peak-to-peak voltage of the amplitude of the clock signal at each one of the start end node, the intermediate node, and the terminal end node of the clock trunk line may be clamped at the inverted threshold at the same time.

Therefore, the potential corresponding to ½ of the peak-to-peak voltage of the amplitude of the clock signal at each one of the start end node, the intermediate node, and the terminal end node of the clock trunk line is clamped at the inverted threshold of the first and second local drivers at the same time. Moreover, the peak-to-peak voltage of the amplitude of the clock signal on the clock trunk line decreases gradually from the output node of the clock driver toward the terminal end node. Hence, the clock signals at the nodes on the clock trunk line are mutually synchronized signals vibrating at the inverted threshold as its central value, and their amplitude relation is as follows. That is, (the amplitude of the clock signal at the start end node)>(the amplitude of the clock signal at the intermediate node)>(the amplitude of the clock signal at the terminal end node). As a result, the clock skew between the output of the second local driver and the output of the first local driver decreases to a level ideally becoming 0, and the delay time between the output of the clock driver and the output of the second local driver, and the delay time between the output of the clock driver and the output of the first local driver are both improved.

Accordingly, the clock delay time between right after the output of the clock driver and the terminal end node can be decreased, and the generation of the clock skew between the output of the first local driver and the output of the second local driver can be prevented or substantially decreased. What is more, since the clamp level is adjusted to the inverted threshold by adjusting the resistance ratio of the first and second resistance bodies, even if the inverted threshold set in the first and second local drivers can take an arbitrary value or is changed to an arbitrary value, it is possible to cope with only by adjusting the resistance ratio in accordance with the case, so that the constitution is practical and flexible. In particular, in the present invention, as a method of improving the clock delay time and the clock skew, it is enough by forming one clock trunk line, and the constitution is quite simple in which the first and second resistance bodies are provided for this clock trunk line, and their resistance ratio is adjusted, and these resistance values are adjusted together with the interconnection resistance of the clock trunk line, and extra space is not needed in design, and the space can be effectively utilized, which contributes to downsizing and practical use of the circuit.

A second aspect of the present invention relates to a clock distributing circuit of the first aspect, wherein the fist and second resistance bodies are both formed of passive elements.

Therefore, the two passive elements respectively function as first and second resistance bodies.

Accordingly, the first and second resistance bodies can be composed of the practical passive elements, and hence the practical and universal clock distributing circuit can be realized. In particular, when the film material such as a doped polysilicon or the like is used as the passive bodies, the first and second resistance bodies can be realized relatively easily by controlling its size (thickness, width, length).

A third aspect of the present invention relates to a clock distributing circuit of the second aspect, wherein the first and second resistance bodies are formed of the same as the material for forming the clock trunk line.

Therefore, the two passive elements formed of the same material as the clock trunk line function as first and second resistance bodies.

Accordingly, by using the film material such as a doped polysilicon or an aluminum as the material for the clock trunk line, it is possible to interconnect the clock trunk line, form the first and second resistance bodies, adjust their resistance ratio, and adjust the interconnection resistance of the clock trunk line and the resistance values of the first and second resistance bodies all in the same manufacturing process.

A fourth aspect of the present invention relates to a clock distributing circuit of the first aspect, wherein the first and second resistance bodies are both formed of active elements.

Therefore, the two active elements respectively function as first and second resistance bodies.

Accordingly, using the practical active elements, the clock distributing circuit capable of decreasing the clock delay time and the clock skew can be realized. In this case, by varying the size or size ratio of the active elements, the clock distributing circuit can be realized. In particular, when the active elements are used as the first and second resistance bodies, as compared with the case of using passive elements, it is advantageous in the aspects of the temperature dependence of the resistance value and the physical size.

A fifth aspect of the present invention relates to a clock distributing circuit of the fourth aspect, wherein the active elements are MOS transistors, and channel resistance values of the MOS transistors are used as resistance values of the first and second resistance bodies.

Therefore, the channel resistances of the two MOS transistors respectively function as first and second resistance bodies.

Accordingly, making use of the channel resistance, from practical point of view, it is beneficial that a higher resistance value can be realized as compared with the case of a film resistance or the like.

A sixth aspect of the present invention relates a clock distributing circuit comprising a differential output type clock driver for receiving a source clock signal, and for outputting a clock signal and an inverted clock signal, which are mutually complementary signals, from an output node and an inverted output node, respectively, a clock trunk line of which a start end node is connected to the output node of the differential output type clock drive, being formed of a material having a resistance component, an inverted clock trunk line of which a start end node is connected to the inverted output node of the differential output type clock driver, being formed in a same condition as the clock trunk line, and of the material having the resistance component, a first local driver of which an input is connected to a terminal end node of the clock trunk line, a second local driver of which an input node is connected to an intermediate node located between the start end node and the terminal end node of the clock trunk line, and a resistance body of which one end and other end are respectively connected to the terminal end node of the clock trunk line and a terminal end node of the inverted clock trunk line, wherein the first and second local drivers have a same inverted threshold, the clock signal and the inverted clock signal outputted by the differential output type clock driver both vibrate at the inverted threshold as a central value, and a resistance value of the resistance body and a resistance value of the resistance component of the clock trunk line are set so that a potential corresponding to ½ of a peak-to-peak voltage of an amplitude of the clock signal at each one of the start end node, the intermediate node, and the terminal end node of the clock trunk line may be clamped at the inverted threshold at the same time.

Therefore, the clock signal and the inverted clock signal outputted by the differential output type clock driver both vibrate complementarily on the center of the inverted threshold of the first and second local drivers, and the resistance body is provided between the terminal end node and the inverted terminal end node, and hence the potential corresponding to ½ of the peak-to-peak voltage of the amplitude of the clock signal at each one of the start end node, the intermediate node, and the terminal end node of the clock trunk line may be clamped at the inverted threshold of the first and second local drivers at the same time. Moreover, the peak-to-peak voltage of the amplitude of the clock signal on the clock trunk line decreases gradually from the start end node toward the terminal end node. Hence, the clock signals at the nodes on the clock trunk line are all mutually synchronized signals vibrating at the inverted threshold as the central value, and their amplitude relation is as follows. That is, (the amplitude of the clock signal at the start end node)>(the amplitude of the clock signal at the intermediate node)>(the amplitude of the clock signal at the terminal end node).

Accordingly, the clock delay time between right after the output of the clock driver and the terminal end node can be decreased, and the generation of the clock skew between the output of the first local driver and the output of the second local driver can be prevented or substantially decreased. In particular, in the invention, only by setting the resistance body between the terminal end nodes of the both trunk lines, the peak-to-peak voltages of the amplitudes of the clock signals on both trunk lines can be reduced, and to adjust this fixed clamp level to the inverted threshold, it is enough to adjust the transistor size of the differential output type clock driver, and hence the adjustment of the resistance ratio is not necessary, and the clamp level can be adjusted relatively easily.

A seventh aspect of the present invention relates to a clock distributing circuit of the sixth aspect, wherein the resistance body is formed of a passive element.

Therefore, the passive element functions as a resistance body.

Accordingly, the resistance body can be composed of the practical passive element, and hence the practical and universal clock distributing circuit can be realized. In particular, when the film material such as a doped polysilicon or the like is used as the passive element, the resistance body can be realized relatively easily by controlling its size (thickness, width, length).

An eight aspect of the present invention relates to a clock distributing circuit of the seventh aspect, wherein the resistance body is formed of the same as the material for forming the clock trunk line and the inverted clock trunk line.

Therefore, the passive element formed on the same material as the clock trunk line and the inverted clock trunk line functions as a resistance body.

Accordingly, by using the film material such as a doped polysilicon or an aluminum as the material for the clock trunk line and the inverted clock trunk line, it is possible to form the clock trunk line and the inverted clock trunk line, form the resistance body, and adjust the interconnection resistance of the clock trunk line all in the same manufacturing process.

A ninth aspect of the present invention relates to a clock distributing circuit of the sixth aspect, wherein the resistance body is formed of an active element.

Therefore, the active element function as a resistance body.

Accordingly, using the practical active element, the clock distributing circuit capable of decreasing the clock delay time and the clock skew can be realized. In this case, by varying the size or size ratio of the active element, the resistance body can easily be realized. In particular, when the active element is used as the resistance body, as compared with the case of using a passive element, it is advantageous in the aspects of the temperature dependence of the resistance value and the physical size.

A tenth aspect of the present invention relates to a clock distributing circuit of the ninth aspect, wherein the active element is a MOS transistor, and a channel resistance value of the MOS transistor is used as a resistance value of the resistance body.

Therefore, the channel resistance of the MOS transistor functions as a resistance body.

Accordingly, making use of the channel resistance, from practical point of view, it is beneficial that a higher resistance value can be realized as compared with the case of the film resistance or the like, and it is practical because the resistance value desired as the resistance body can be realized easily.

An eleventh aspect of the present invention relates to a clock distributing circuit of the ninth aspect, wherein the active element comprises first and second MOS transistors, one semiconductor region and other semiconductor region of the first MOS transistor are connected to the terminal end node of the clock trunk line and the terminal node of the inverted clock trunk line, respectively, and one semiconductor region and other semiconductor region of the second MOS transistor are connected to the terminal end node of the clock trunk line and the terminal end node of the inverted clock trunk line, respectively.

Therefore, the combined resistance value of the channel resistance values of the first and second MOS transistors is the value of the resistance body.

Accordingly, since the resistance body can be formed by using the CMOS process or the like, it is convenient in the manufacture, and it is also beneficial because the influence depending on the threshold of the MOS transistor that may occur when the MOS transistor is used alone as the resistance body can be prevented.

A twelfth aspect of the present invention relates to a clock distributing circuit comprising a differential output type clock driver for receiving a source clock signal, and for outputting a clock signal and an inverted clock signal, which are mutually complementary signals, from an output node and an inverted output node, respectively, a clock trunk line of which a start end node is connected to the output node of the differential output type clock drive, being formed of a material having a resistance component, an inverted clock trunk line of which a start end node is connected to the inverted output node of the differential output type clock driver, being formed of the material having the resistance component so as to have a same interconnection length as the clock trunk line, a first differential input type local driver of which one and other inputs are connected to a terminal end node of the clock trunk line and a terminal end node of the inverted clock trunk line, respectively, a second differential input type local driver of which one and input nodes are connected to an intermediate node located between the start end node and the terminal end node of the clock trunk line and an intermediate node located between the start end node and the terminal end node of the inverted clock trunk line, respectively, and a resistance body of which one end and other end are respectively connected to the terminal end node of the clock trunk line and the terminal end node of the inverted clock trunk line, wherein the first and second differential input type local drivers have a same inverted threshold, the clock signal and the inverted clock signal outputted by the differential output type clock driver both vibrate at the inverted threshold as a central value, and a resistance value of the resistance body and both resistance values of the resistance components of the clock trunk line and the inverted clock trunk line are set so that a potential corresponding to ½ of a peak-to-peak voltage of an amplitude of the clock signal at each one of the start end nodes, the intermediate nodes, and the terminal end nodes of the clock trunk line and the inverted clock trunk line may be clamped at the inverted threshold at the same time.

Therefore, the clock signal and the inverted clock signal outputted by the differential output type clock driver both vibrate complementarily on the center of the inverted threshold of the first and second local drivers, and the resistance body is provided between the terminal end node of the clock trunk line and the terminal end node of the inverted clock trunk line, and hence the clock signal and the inverted clock signal at the terminal end nodes are both clamped at the inverted threshold of the first and second differential input type local drivers. By the adjustment of the value of the resistance body and the interconnection resistance value of each trunk line, even at the intermediate node, the potential corresponding to ½ of the peak-to-peak voltage of the amplitude of the clock signal and the potential corresponding to ½ of the peak-to-peak voltage of the amplitude of the inverted clock signal are clamped at the inverted threshold at the same time. As a result, the peak-to-peak voltage of the amplitude of the clock signal on the clock trunk line decreases gradually from the start end node toward the terminal end node, and similarly the peak-to-peak voltage of the amplitude of the inverted clock signal on the inverted clock trunk line decreases gradually from the start end node toward the terminal end node. That is, the clock signals at nodes on the clock trunk line are all mutually synchronized signals vibrating at the inverted threshold as the central value, and their amplitude relation is as follows. That is, (the amplitude of the clock signal at the start end node)>(the amplitude of the clock signal at the intermediate node)>(the amplitude of the clock signal at the terminal end node). Similarly, the inverted clock signals at nodes on the inverted clock trunk line are all mutually synchronized signals vibrating at the inverted threshold as the central value, and their amplitude relation is as follows. That is, (the amplitude of the inverted clock signal at the start end node)>(the amplitude of the inverted clock signal at the intermediate node) >(the amplitude of the inverted clock signal at the terminal end node).

Accordingly, the clock delay time between right after the output of the clock driver and the terminal end node can be decreased, and the generation of the clock skew between the output of the first local driver and the output of the second local driver can be prevented or substantially decreased, while, as the effect of in-phase signal removal by the differential input, the noise resistance can be enhanced. Suppose a line for transmitting a signal of large amplitude is located close to the clock trunk line or the inverted clock trunk line, the crosstalk is likely to occur, and, what is more, as the amplitude itself of the clock signal on each of the clock trunk line and the inverted clock trunk line decreases along with reduction of power consumption in the apparatus, the influence of the crosstalk becomes larger, and hence the noise increases significantly, but the invention can remove such noise, and in this respect the invention is preferable when applied in the field of the reduction of power consumption of the apparatus. In addition, the invention brings about a favorable result on the temperature drift as a result of employing the structure of the removal of in-phase signal by differential input.

A thirteenth aspect of the present invention relates to a clock distributing circuit of the twelfth aspect, wherein the resistance body is formed of a passive element.

Therefore, the passive element functions as a resistance body.

Accordingly, the resistance body can be composed of the practical passive element, and hence the practical and universal clock distributing circuit can be realized. In particular, when the film material such as a doped polysilicon or the like is used as the passive element, the resistance body can be realized relatively easily by controlling its size (thickness, width, length).

A fourteenth aspect of the present invention relates to a clock distributing circuit of the thirteenth aspect, wherein the resistance body is formed of the same as the material for forming the clock trunk line and the inverted clock trunk line.

Therefore, the passive element formed of the same material as the clock trunk line and the inverted clock trunk line function as the resistance body.

Accordingly, by using the film material such as a doped polysilicon or an aluminum as the material for the clock trunk line and the inverted clock trunk line, it is possible to form the clock trunk line and the inverted clock trunk line, form the resistance body, and adjust the interconnection resistance of the clock trunk line all in the same manufacturing process.

A fifteenth aspect of the present invention relates to a clock distributing circuit of claim the twelfth aspect wherein the resistance body is formed of an active element.

Therefore, the active element functions as the resistance body.

Accordingly, using the active element, the clock distributing circuit capable of decreasing the clock delay time and the clock skew can be realized. In this case, by varying the size or size ratio of the active element, the resistance body can easily be realized. In particular, when the active element is used as the resistance body, as compared with the case of using a passive dement, it is advantageous in the aspects of the temperature dependence of the resistance value and the physical size.

A sixteenth aspect of the present invention relates to a clock distributing circuit of the fifteenth aspect, wherein the active element is a MOS transistor, and a channel resistance value of the MOS transistor is used as a resistance value of the resistance body.

Therefore, the channel resistance of the MOS transistor functions as the resistance body.

Accordingly, making use of the channel resistance, from practical point of view, it is beneficial that a higher resistance value can be realized as compared with the case of a film resistance or the like, and it is practical because the resistance value desired as the resistance body can be realized easily.

A seventeenth aspect of the present invention relates to a clock distributing circuit of the sixteenth aspect, wherein the active element comprises first and second MOS transistors, one semiconductor region and other semiconductor region of the first MOS transistor are connected to the terminal end node of the clock trunk line and the terminal node of the inverted clock trunk line, respectively, and one semiconductor region and other semiconductor region of the second MOS transistor are connected to the terminal end node of the clock trunk line and the terminal end node of the inverted clock trunk line, respectively.

Therefore, the combined resistance value of the channel resistance values of the first and second MOS transistors is a value of the resistance body.

Accordingly, since the resistance body can be formed by using the CMOS process or the like, it is convenient in the manufacture, and it is also beneficial because the influence depending on the threshold of the MOS transistor that may occur when the MOS transistor is used alone as the resistance body can be prevented.

An eighteenth aspect of the present invention relates to a clock distributing circuit comprising a differential output type clock driver for receiving a source clock signal, and for outputting a clock signal and an inverted clock signal, which are mutually complementary signals, from an output node and an inverted output node, respectively, a clock trunk line of which a start end node is connected to the output node of the differential output type clock drive, being formed of a material having a resistance component, an inverted clock trunk line of which a start end node is connected to the inverted output node of the differential output type clock driver, being formed of the material having the resistance component so as to have a same interconnection length as the clock trunk line, a first differential input type local driver of which one and other inputs are connected to a terminal end node of the clock trunk line and a terminal end node of the inverted clock trunk line, respectively, a second differential input type local driver of which one and another input nodes are connected to an intermediate node located between the start end node and the terminal end node of the clock trunk line and an intermediate node located between the start end node and the terminal end node of the inverted clock trunk line, respectively, a first resistance body of which one and another ends are connected to the terminal end node of the clock trunk line and a supply potential node, respectively, a second resistance body of which one and another ends are connected to the terminal end of the clock trunk line a ground node, respectively, a third resistance body of which one and another ends are connected to the terminal end node of the inverted clock trunk line and the supply potential node, respectively, and a fourth resistance body of which one and another ends are connected to the terminal end node of the inverted clock trunk line and the ground node, respectively, wherein the first and second differential input type local drivers have a same inverted threshold, a resistance ratio of the first resistance body and the second resistance body is set so that a potential corresponding to ½ of a peak-to-peak voltage of an amplitude of the clock signal at the terminal end node of the clock trunk line may be the inverted threshold, a resistance ratio of the third resistance body and the fourth resistance body is set so that a potential corresponding to ½ of a peak-to-peak voltage of an amplitude of the inverted clock signal at the terminal end node of the inverted clock trunk line may be the inverted threshold, a resistance value of the resistance component of the clock trunk line and both resistance values of the first and second resistance bodies are set so that the potential corresponding to ½ of the peak-to-peak voltage of the amplitude of the clock signal at each one of the start end node, the intermediate node, and the terminal end node of the clock trunk line may be clamped at the inverted threshold at the same time, and a resistance value of the resistance component of the inverted clock trunk line and both resistance values of the third and fourth resistance bodies are set so that the potential corresponding to ½ of the peak-to-peak voltage of the amplitude of the inverted clock signal at each one of the start end node, the intermediate node, and the terminal end node of the inverted clock trunk line may be clamped at the inverted threshold at the same time.

Therefore, the potential corresponding to ½ of the peak-to-peak voltage of the amplitude of the clock signal at each one of the start end node, the intermediate node, and terminal end node of the clock trunk line is clamped at the inverted threshold of the first and second differential input type local drivers at the same time. Similarly, concerning the inverted clock trunk line, the potential corresponding to ½ of the peak-to-peak voltage of the amplitude of the inverted clock signal at each of its start end node, intermediate node, and terminal end node is clamped at the inverted threshold of the first and second differential input type local drivers at the same time. Moreover, the peak-to-peak voltages of the amplitudes of the clock signal on the clock trunk line and the inverted clock signal on the inverted clock trunk line both decrease gradually from the start end node toward the corresponding terminal end node. As a result, the clock signals at nodes on the clock trunk line are mutually synchronized signals vibrating at the inverted threshold as the central value, and their amplitude relation is as follows. That is, (the amplitude of the clock signal at the start end node)>(the amplitude of the clock signal at the intermediate node)>(the amplitude of the clock signal at the terminal end node). Similarly, the inverted clock signals at nodes on the inverted clock trunk line are all mutually synchronized signals vibrating at the inverted threshold as central value, and their amplitude relation is as follows. That is, (the amplitude of the inverted clock signal at the start end node)>(the amplitude of the inverted clock signal at the intermediate node)>(the amplitude of the inverted clock signal at the terminal end node). Hence, the clock skew between the output of the second differential input type local driver and the output of the first differential input type local driver decreases to a level ideally becoming 0, and the delay time between the output of the differential output clock driver and the output of the second differential input type local driver, and the delay time between the output of the differential output type clock driver and the output of the first differential input type local driver are outstandingly improved.

Accordingly, the clock delay time between right after the output of the clock driver and the terminal end node can be decreased, and the generation of clock skew between the output of the first local driver and the output of the second local driver can be prevented or substantially decreased, while, as the effect of in-phase signal removal by the differential input, the noise resistance can be enhanced. In particular, in the invention, since it is designed to adjust the clamp level individually in the clock trunk line and the inverted clock trunk line, the degree of freedom of the adjustment of the clamp level is greater as compared with the constitution for adjusting the clock trunk line and the inverted clock trunk line at the same time.

A nineteenth aspect of the present invention relates to a clock distributing circuit of the eighteenth aspect, wherein the first to fourth resistance bodies are formed of passive elements.

Therefore, the four passive elements respectively function as first, second, third, and fourth resistance bodies.

Accordingly, the first to fourth resistance bodies are composed of the practical passive elements, and hence the practical and universal clock distributing circuit can be realized. In particular, when the film material such as a doped polysilicon or the like is used as the passive elements, the first to fourth resistance bodies can be realized relatively easily by controlling their size (thickness, width, length).

A twentieth aspect of the present invention relates to a clock distributing circuit of the eighteenth aspect, wherein the first to fourth resistance bodies are formed of active elements.

Therefore, the four active elements respectively function as first, second, third, and fourth resistance bodies.

Accordingly, using the practical active elements, the clock distributing circuit can be realized. In this case, by varying the size or size ratio of the active elements, the first to fourth resistance bodies can easily be realized. In particular, when the active elements are used as the first to fourth resistance bodies, as compared with the case of using passive elements, it is advantageous in the aspects of the temperature dependence of the resistance value and the physical size.

A twenty-first aspect of the present invention relates to a clock distributing circuit comprising a clock trunk line for transmitting a clock signal, plural local drivers provided at an intermediate node and a terminal end node of the clock trunk line, and a resistance body provided at the terminal end node, wherein an interconnection resistance of the clock trunk line and a resistance value of the resistance body are set so that a potential corresponding to ½ of a peak-to-peak voltage of an amplitude of the clock signal at each one of a start end node, the intermediate node, and the terminal end node of the clock trunk line may be an inverted threshold of the local drivers at the same time.

A twenty-second aspect of the present invention relates to a clock distributing circuit of the twenty-first aspect, wherein the resistance body comprises a first resistance body provided between a supply potential node and the terminal end node, and a second resistance body provided between a ground node and the terminal end node.

A twenty-third aspect of the present invention relates to a clock distributing circuit of the twenty-second aspect, wherein the clock signal comprises a normal type clock signal and a reverse type clock signal, the clock trunk line comprises a normal type clock trunk line for transmitting the normal type clock signal, and a reverse type clock trunk line for transmitting the reverse type clock signal, the local drivers are differential input type local drivers for receiving the normal type clock signal on the normal type clock trunk line and the reverse type clock signal on the reverse type clock trunk line, and the resistance body is provided on both the normal type clock trunk line and the reverse type clock trunk line.

A twenty-fourth aspect of the present invention relates to a clock distributing circuit of the twenty-first aspect, wherein the clock signal comprises a normal type clock signal and a reverse type clock signal, the clock trunk line comprises a normal type clock trunk line for transmitting the normal type clock signal, and a reverse type clock trunk line for transmitting the reverse type clock signal, and the resistance body is provided between the terminal end node of the normal type clock trunk line and the terminal end node of the reverse type clock trunk line.

A twenty-fifth aspect of the present invention relates to a clock distributing circuit of the twenty-fourth aspect, wherein the local drivers are differential input type local drivers for receiving the normal type clock signal on the normal type clock trunk line and the reverse type clock signal on the reverse type clock trunk line.

According to the twenty-first to twenty-fifth aspects of the present invention, the clock delay time and the clock skew can be improved.

Especially according to the twenty-third and twenty-fifth aspects, the noise can be reduced.

The present invention is devised to overcome the problems of the prior art, and it is hence an object thereof to improve the clock delay time and clock skew which may occur in the clock distributing circuit.

It is a further object of the invention to reduce the noise occurring in the clock signal on the clock trunk line.

These and other objects, features, aspects and advantages of the present invention will become more apparent from the following description of the present invention when taken in conjunction with the accompanying drawings.

DESCRIPTION OF THE PREFERRED EMBODIMENTS

In the preferred embodiments of the present invention, a potential corresponding to ½ of a peak-to-peak voltage of an amplitude of a clock signal on a clock trunk line is clamped at ½ of a supply voltage Vdd at the same time. That is, in the preferred embodiments below, an inverted threshold of each local driver is set at Vdd/2. Of course, when setting the inverted threshold at other arbitrary value, the clamp level is set at the arbitrary value. As departing from an output of a clock driver, that is, a start end node of the clock trunk line, the amplitude of the clock signal is decreased, and a clock delay and a clock skew are reduced, according to a circuit constitution.

In the present invention, therefore, as a method for adjusting the clamp level of the clock signal to the inverted threshold of the local driver (which corresponds to the highest level among the levels at which an inverter logic is inverted, and is also called as a logic threshold), roughly three methods are created. That is, ① a method of adjusting by a resistance ratio, ② a method of adjusting by the amplitude value, and ③ a method of applying the method ① into a complementary constitution. The method ① is employed in the first and second preferred embodiments, the method ② is employed in the third to sixth preferred embodiments, and the method ③ is employed in the seventh and eighth preferred embodiments.

The details of the preferred embodiments of the present invention are described below.

(First Preferred Embodiment)

Figure 1:
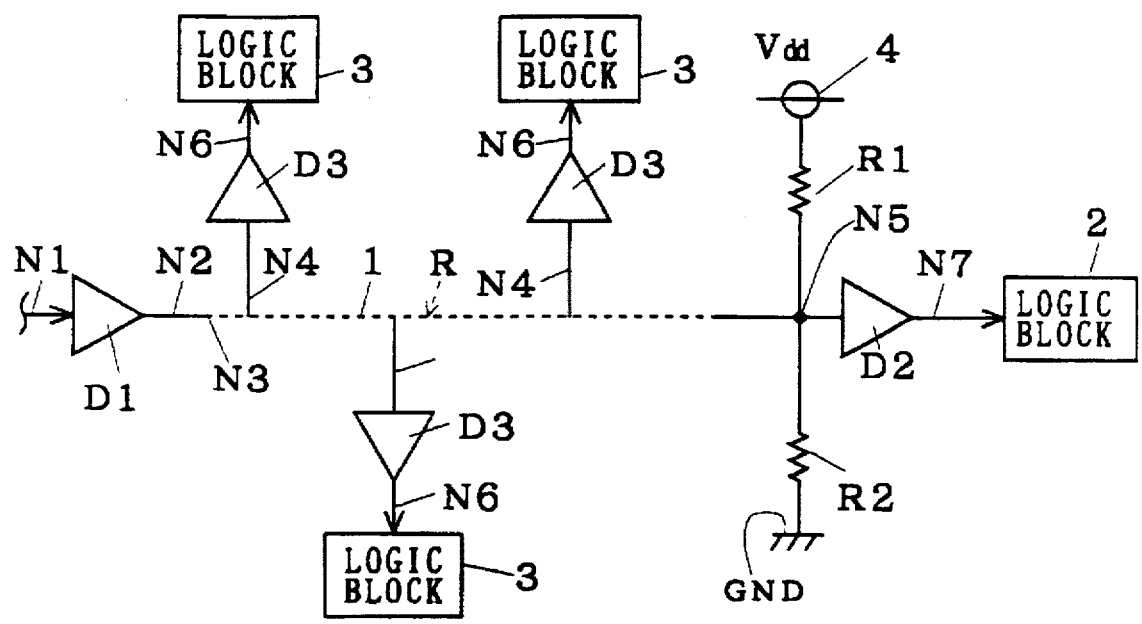
FIG. 1 is a block diagram showing the first preferred embodiment of the invention.

FIG. 1 is a block diagram showing a constitution of a first preferred embodiment of a clock distributing circuit of the present invention. In FIG. 1, the following reference numerals are used. That is, a reference numeral 1 is a clock trunk line, D1 is a clock driver, D2 is a first local driver, D3 is a second local driver, N1 is an input node of a source clock signal, N2 is an output node of the clock driver D1, N3 is a start end node of the clock trunk line 1, N4 is an intermediate node of the clock trunk line 1, N5 is a terminal end node of the clock trunk line 1, N6 is an output node of the second local driver D3, N7 is an output node of the first local driver D2, 2 and 3 are logic blocks, 4 is a supply potential node, and GND is a ground node.

The clock trunk line 1 is formed of a film material having resistance components, such as a doped polysilicon film or an aluminum film, and is interconnected on a semiconductor integrated circuit or a semiconductor substrate. Herein, the clock trunk line 1 is formed by the CMOS process, same as the other elements (D1, D2, D3, 3, 4). The interconnection of the clock trunk line 1 is as follows.

That is, the start end node N3 of the clock trunk line 1 is connected to the output node N2 of the clock driver D1, and therefore the output node N2 corresponds to the start end node N3. The terminal end node N5 of the clock trunk line 1 is connected to the input node of the first local driver D2. An arbitrary node located somewhere between the start end node N3 and the terminal end node N5, that is, each intermediate node N4 is connected to the input node of the corresponding second local driver D3.

Figure 2:
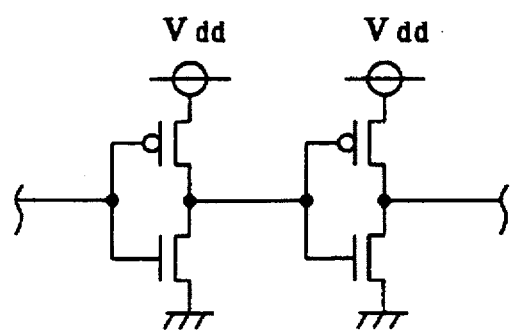
FIG. 2 is a diagram showing a practical structure example of a clock driver.

The clock driver D1 receives the source clock signal at its input node N1, and shapes its waveform, and outputs the shaped source clock signal from its output node N2 as a clock signal. A structural example of this driver D1 is shown in FIG. 2. In FIG. 2, the driver D1 is composed of two stages of CMOS inverters.

Figure 3:
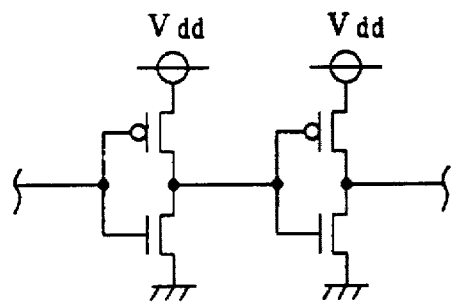
FIG. 3 is a diagram showing a practical structure example of a local driver.

Not limited to the first preferred embodiment, but also in the other preferred embodiments, the first local driver D2 and the second local driver D3 are both constituted, for example, as shown in FIG. 3, and the inverted threshold values of the two are set equally. As a typical example, herein, the inverted threshold is set at Vdd/2 as described above. Incidentally, the both drivers D2, D3 are not necessary constituted as identical drivers, but the constitutions may be different as far as the both inverted threshold values are set equally.

The first local driver D2 shapes the waveform of the clock signal received from the terminal end node N5, and supplies the shaped clock signal from its output node N7 into the logic block 2.

Similarly, the second local driver D3 shapes the waveform of the clock signal received from the intermediate node N4, and supplies the shaped clock signal from its output node N6 into the logic block 3.

Figure 4:
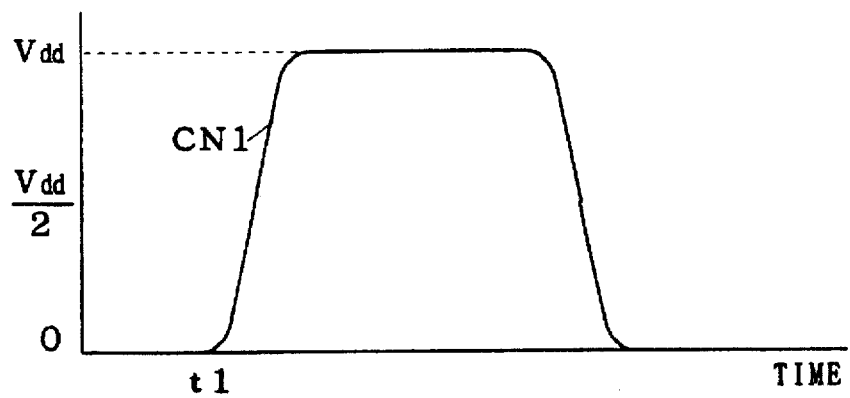
FIG. 4 is a diagram showing input clock waveforms in the first and second preferred embodiments.
Figure 5:
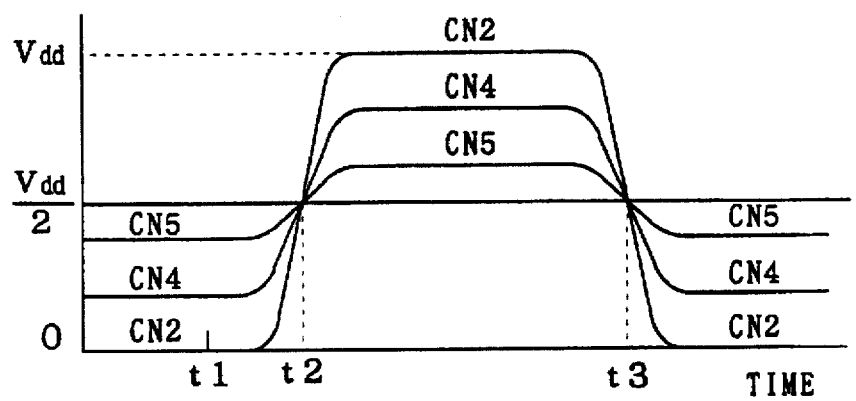
FIG. 5 is a diagram showing clock waveforms on clock trunk line in the first and second preferred embodiments.

FIG. 4 shows a clock waveform CN1 of the source clock signal at the input node N1, and this source clock signal is driven by the clock driver D1, and the driver D1 outputs the clock signal shown as a clock waveform CN2 in FIG. 5.

Back to FIG. 1, in the terminal end node N5 at the remotest position from the clock driver D1, a first resistance element R1 and a second resistance element R2 are provided as follows as clamp resistance. That is, a one end and another end of the first resistance element R1 are connected respectively to the supply potential node 4 to which the supply voltage Vdd is applied and the terminal end node N5, and a one end and another end of the second resistance element R2 are connected to the terminal end node N5 and the grounded ground node GND, respectively. The both resistance elements R1, R2 are herein passive elements formed of the same film material as the material for forming the clock trunk line 1. Therefore, same as the clock trunk line 1, they can be formed by the CMOS process.

By varying a resistance ratio of the both resistance elements R1 and R2, the clamp level of the clock signal at the terminal end node N5 is set at the inverted threshold of the first and second local drivers D2, D3. In this preferred embodiment, the inverted threshold is equal to ½Vdd, and hence the resistance ratio is 1:1 (when an arbitrary value is used as the inverted threshold, the resistance ratio must be set at a corresponding value).

Moreover, by varying the resistance values of the both resistance elements R1 and R2, and the resistance value of the interconnection resistance R of the clock trunk line 1, the values of the resistances R1, R2, R are set so that a potential corresponding to ½ of a peak-to-peak voltage of an amplitude of the clock signal at each node (N2, N4, N5) may be the inverted threshold, that is, ½Vdd, all at the same time. In this case, the interconnection resistance R of the clock trunk line 1 shows a uniform distribution from the start end node N3 to the terminal end node N5.

In this way, when the first and second resistance elements R1 and R2 and the interconnection resistance R are set at desired values, of each node, the amplitude of the clock signal at the terminal end node N5 becomes the smallest, and its clock waveform is the clock waveform CN5 shown in FIG. 5. By contrast, the intermediate node N4 in FIG. 1 is remote from the both resistance elements R1 and R2 by a certain distance, and is close also to the output node N2 of the clock driver D1. As a result of the effect of the interconnection resistance R of the clock trunk line 1, the amplitude of the clock signal at node N4 is larger than that of the terminal end node N5 and smaller than that of the output node N2 of the clock driver D1 as shown in the clock waveform CN4 in FIG. 5. Therefore, as in this preferred embodiment, when the inverted threshold of the first and second local drivers D2, D3 is set at ½Vdd, the outputs of the first and second local drivers D2, D3 are obtained as the shaped clock signals as shown in clock waveforms CN6 and CN7 in FIG. 6. The clock skew between the both output nodes N6 and N7 is substantially decreased. Ideally, the clock skew may be said to be 0. The clock delay time (t2–t1) from the output node N2 is notably smaller than in the prior art.

As described above, the first and second resistance elements R1 and R2 in FIG. 1 in this first preferred embodiment are the passive elements, being composed of, for example, a doped polysilicon film used in forming a gate of a MOS transistor, or an aluminum film used in interconnection or the like. Therefore, to vary the resistance values and the resistance ratio of the both resistance elements R1 and R2, same as in the clock trunk line 1, the film size (thickness, width, length) of the doped polysilicon film, the aluminum film or the like should be changed.

Setting of the inverted threshold of the first and second local drivers D2 and D3 can be realized by varying a ratio of the transistor size (gate width, gate length) of each of the P channel transistor and the N channel transistor in the first and second local drivers D2 and D3.

The first and second resistance elements R1 and R2 are also called first and second resistance bodies.

(Second Preferred Embodiment)

Figure 7:
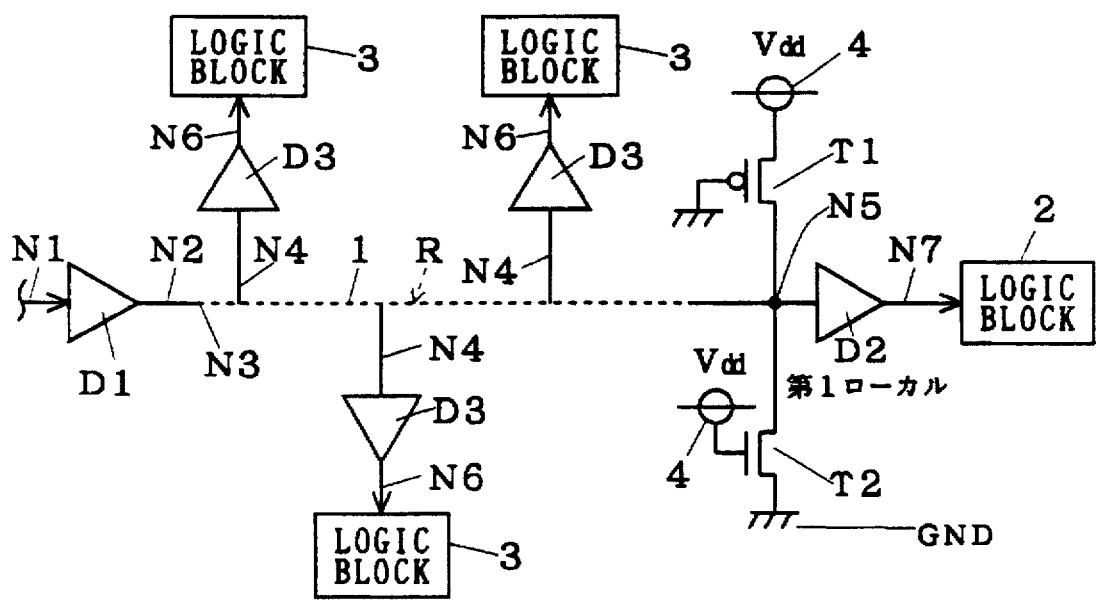
FIG. 7 is a block diagram showing the second preferred embodiment of the invention.

FIG. 7 is a block diagram showing the constitution of the clock distributing circuit in the second preferred embodiment of the present invention. In this second preferred embodiment, the resistance bodies R1 and R2 in the first preferred embodiment are both replaced by MOS transistors which are active elements. In this case, a channel resistance of the MOS transistor is utilized.

In FIG. 7, the following reference numerals are used. That is, D1 is a clock driver, D2 is a first local driver, D3 is a second local driver, N1 is an input node of a source clock signal, N2 is an output node of the clock driver D1, 1 is a clock trunk line, N3 is a start end node of the clock trunk line 1, N4 is an intermediate node of the clock trunk line 1, N5 is a terminal end node of the clock trunk line 1, and N6 and N7 are output nodes of the second and first local drivers D3 and D2, respectively. The constitution and operation of these elements are same as described in the first preferred embodiment.

In FIG. 7, in the terminal end node N5 remotest from the clock driver D1, a first MOS transistor T1 of a p channel type and a second MOS transistor T2 of an n channel type are provided as clamp transistors. One end (or a drain region) of the first MOS transistor T1 is connected to the terminal end node N5, the other end (or a source region) of the first MOS transistor T1 is connected to the supply potential node 4, and its gate electrode is connected to the ground node. Similarly, one end (or a drain region) of the second MOS transistor T2 is connected to the terminal end node N5, its other end (or a source region) is connected to the ground node GND, and its gate electrode is connected to the supply potential node 4. The first and second MOS transistors T1 and T2 are also known as first and second resistance bodies, respectively.

By varying the channel resistance ratio of the first and second MOS transistors T1, T2, or by varying the transistor ratio, the clamp level of a potential corresponding to ½ of a peak-to-peak voltage of an amplitude of the clock signal at the terminal end node N5 is set at an inverted threshold of the first and second local drivers D2, D3 (it is set at ½Vdd also in this example).

Also, by varying each channel resistance value of the both transistors T1 and T2, hence individual transistor sizes (when either gate width or gate length is changed, the transistor size given as their ratio also varies), and varying the value of the interconnection resistance R of the clock trunk line 1, the channel resistance values of the both transistors T1 and T2 and the value of the interconnection resistance R are set so that each potential of each node (N2, N4, N5) is clamped at the potential corresponding to ½ of the peak-to-peak voltage of the amplitude of clock signal at the same time.

In this way, when the interconnection resistance R and the first and second MOS transistors T1 and T2 are set at desired sizes, at the node N5, the amplitude of the clock signal becomes the smallest, and the clock signal as shown in the clock waveform CN5 in FIG. 5 is obtained. The intermediate node N4 in FIG. 7 is remote from the both transistors T1 and T2 by a certain distance, and is close also to the output node N2 of the clock driver D1. Due to the effect of the interconnection resistance R of the clock trunk line 1, the amplitude of the clock signal at the node N4 is larger than that of the terminal end node N5 and smaller than that of the output node N2 of the clock driver D1 as shown in the clock waveform CN4 in FIG. 5.

Figure 6:
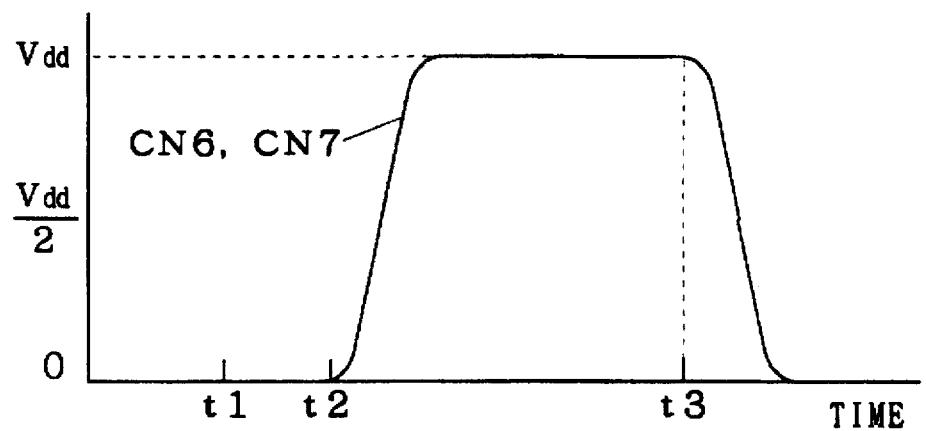
FIG. 6 is a diagram showing waveforms of output clocks of local drivers in the first and second preferred embodiments.

Herein, the inverted threshold of the local drivers D2, D3 is set at ½Vdd, the outputs of the first and second local drivers D2, D3 are obtained as wave-shaped clocks as shown in the clock waveforms CN7 and CN6 in FIG. 6, respectively, and the clock skew between the both output nodes N6 and N7 is substantially decreased. Ideally, the clock skew becomes 0. The clock delay time (T2−T1) from the output node N2 also decreases.

Setting of the inverted threshold of the first and second local drivers D2, D3 is realized by varying the size ratio of the P channel MOS transistor and the N channel MOS transistor in the first and second local drivers.

The first and second MOS transistors T1, T2 for clamping are not limited to those shown in FIG. 7, but may be realized also by other constitution. For example, by the connection shown in FIG. 8 or FIG. 9, it is possible to realize the first and second MOS transistors T1 and T2.

The foregoing first and second preferred embodiments, different from the third preferred embodiment described later, are more practical arts in a point of view that the clock distribution can be realized with the small clock delay and the small clock skew by using one clock trunk line. Moreover, the existing CMOS process can be employed in forming the first and second resistance bodies and adjusting their resistance ratio and resistance values, which is also advantageous in manufacture.

Especially in the second preferred embodiment, as the resistance value of the first and second resistance bodies, the channel resistance of the MOS transistor is utilized. In this manner, the method of utilizing the channel resistance without using the film resistance is advantageous in ① ease of realizing a desired relatively high resistance value, ② temperature characteristic of resistance, and ③ physical size.

The first resistance bodies (R1, T1) and the second resistance bodies (R2, T2) described in the first and second preferred embodiments are collectively called "resistance body." When using this appellation, setting of the resistance ratio and resistance values of the first resistance body and the second resistance body is called "setting of the resistance value of the resistance body." The same appellation is used in the seventh and eighth preferred embodiments described later.

(Third Preferred Embodiment)

Figure 10:
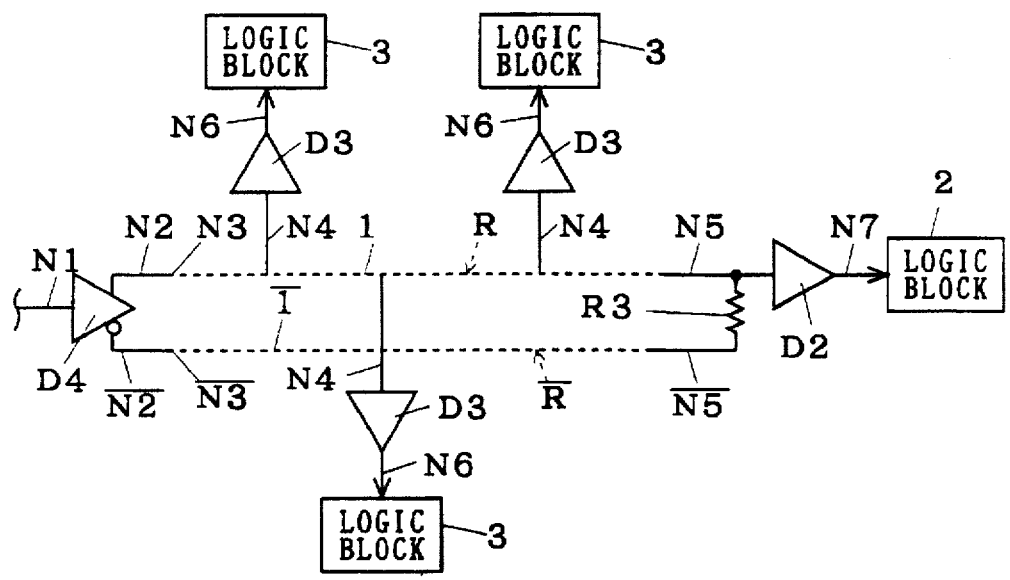
FIG. 10 is a block diagram showing the third preferred embodiment of the invention.

FIG. 10 is a block diagram showing the constitution of the clock distributing circuit in the third preferred embodiment of the present invention. In the diagram, a reference numeral D4 denotes a differential output type clock driver for receiving a source signal to output a clock signal and an inverted clock signal which are mutually complementary signals, a reference numeral D2 is a first local drive, a reference numeral D3 is a second local driver, a reference numeral N1 is an input node of the source clock signal, a reference numeral N2 is an output node (normal rotation) of the differential output type clock driver D4, a reference numeral $\overline{N2}$ is an inverted output node (reverse rotation) of the differential output type clock driver D4, a reference numeral 1 is a clock trunk line (normal rotation), a reference numeral $\overline{1}$ is an inverted clock trunk line (reverse rotation), a reference numeral N3 is a start end node (normal rotation) of the clock trunk line 1, a reference numeral $\overline{N3}$ is a start end node (reverse rotation) of the inverted clock trunk line $\overline{1}$, a reference numeral N4 is an intermediate node (normal rotation) of the clock trunk line 1, a reference numeral N5 is a terminal end node (normal rotation) of the clock trunk line 1, a reference numeral $\overline{N5}$ is a terminal end node (reverse rotation) of the inverted clock trunk line $\overline{1}$, a reference numeral N6 is an output node of the second local driver D3, and a reference numeral N7 is an output node of the first local driver D2.

Of these constituent components, the same reference numerals as in the first preferred embodiment are identical in constitution and operation.

Figure 11:
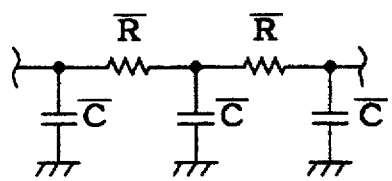
FIG. 11 is a diagram showing an equivalent circuit composed of interconnection resistance and interconnection capacitance on an inverted clock trunk line.
Figure 33:
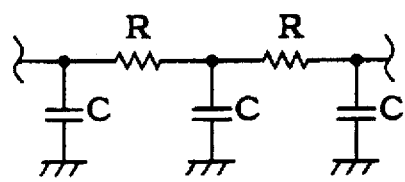
FIG. 33 is a diagram showing an equivalent circuit of the clock trunk line composed of interconnection resistance and interconnection capacitance.
Figure 34:
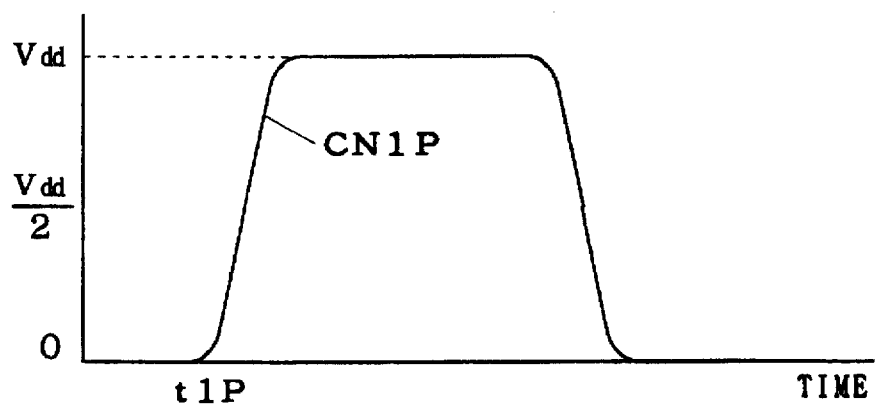
FIG. 34 is a diagram showing an input clock waveform in the prior art.
Figure 35:
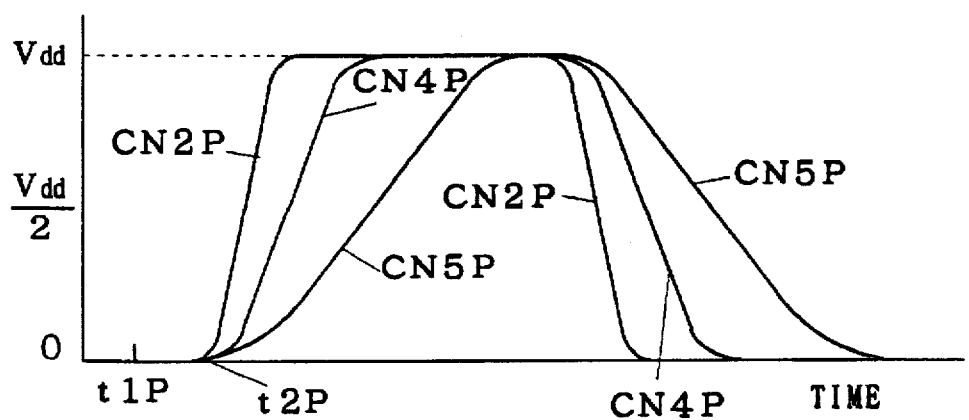
FIG. 35 is a diagram showing clock waveforms on the clock trunk line in the prior art.
Figure 36:
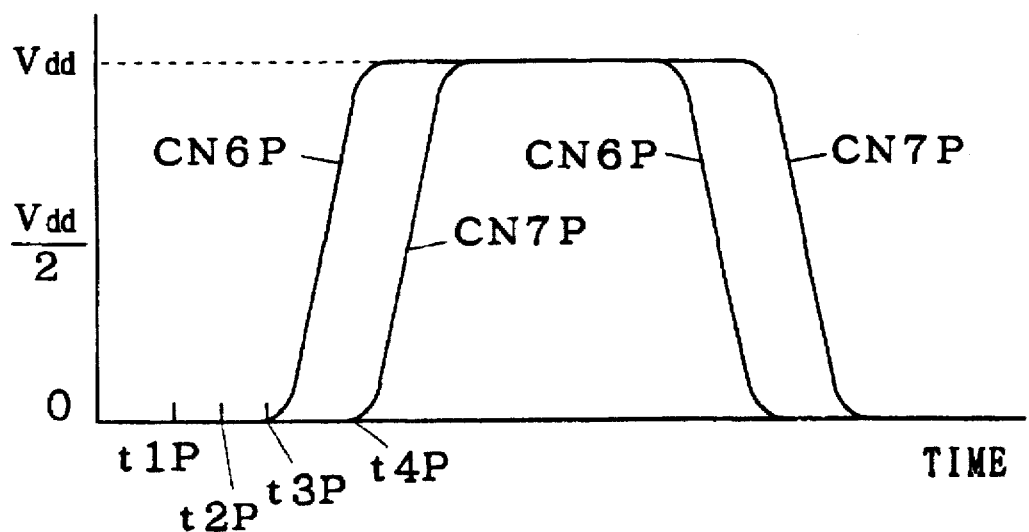
FIG. 36 is a diagram showing local driver output waveforms in the prior art.

The inverted clock trunk line $\overline{1}$ is formed in the same condition and same material as the clock trunk line 1, and its start end node $\overline{N3}$ is connected to the inverted output node $\overline{N2}$ of the differential output type clock driver D4. As for this inverted clock trunk line $\overline{1}$, same as the clock trunk line 1 (see FIG. 33), the interconnection resistance $\overline{R}$ and the interconnection capacitance $\overline{C}$ which is a floating capacitance are generated. Its equivalent circuit is shown in FIG. 11.

Figure 12:
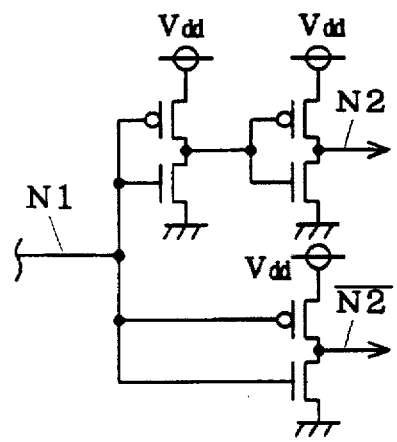
FIG. 12 is a diagram showing a structure example of a differential output type clock driver.

An example of constitution of the differential output type clock driver D4 is shown in FIG. 12.

Figure 13:
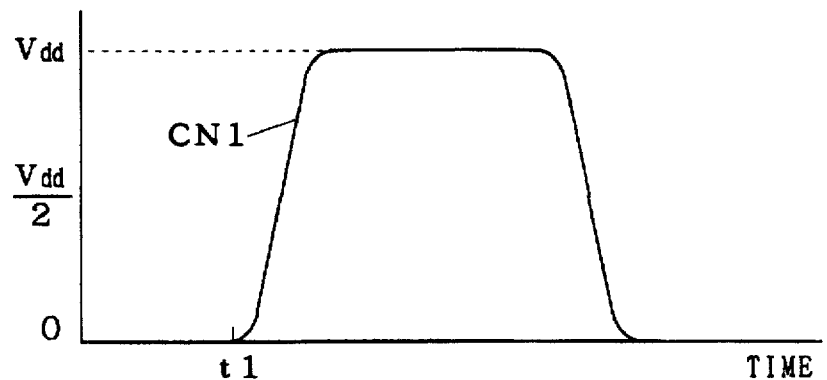
FIG. 13 is a diagram showing input clock waveforms in the third to seventh embodiments.
Figure 14:
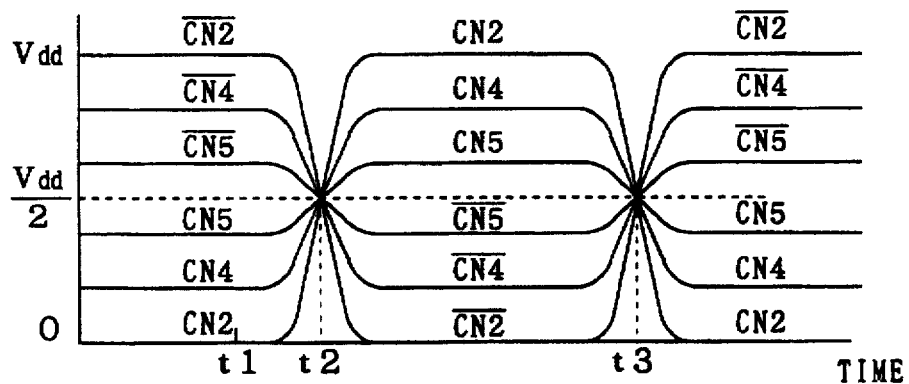
FIG. 14 is a diagram showing clock waveforms on the clock trunk line in the third to seventh embodiments.

The source clock signal shown as a clock waveform CN1 in FIG. 13 is driven by the differential output type clock driver D4, and is outputted as the clock signal given by a clock waveform CN2 and the inverted clock signal given by a clock waveform $\overline{CN2}$ in FIG. 14.

In FIG. 10, between the terminal end node N5 and the terminal end node $\overline{N5}$, which are both located at the remotest position from the differential output type clock driver D4, a clamp resistance R3 is provided as a fixed value. This clamp resistance R3 is a passive element, and is a resistance body formed of the same material as the clock trunk line 1 and the inverted clock trunk line $\overline{1}$. The clock signals at the terminal end node N5 and the terminal end node $\overline{N5}$ are complementary signals, and herein, as a typical example, also supposing that these clock signals are set at the clock signal vibrating on the center of Vdd/2, only by receiving the clamp resistance R3, the both clock signals are clamped at the potential of ½Vdd. Accordingly, the inverted threshold values of both first and second local drivers D2 and D3 are set at the level of ½Vdd. The differential output type clock driver D4 is set so that the clock signal and the inverted clock signal may be both complementary signals vibrating on the central level of Vdd/2.

Changing of the clamp level is realized by varying the transistor ratio of the P and N channel transistors for composing the differential output type clock driver D4. Depending on this change, the central level of the amplitude of each of the clock signal and the inverted clock signal outputted from the differential output type clock driver D4 is changed.

Further varying the resistance value of the clamp resistance R3 and the resistance value of the interconnection resistance R of the clock trunk line 1, the resistances R3 and R are set so that the potential corresponding to ½ of the peak-to-peak voltage of the amplitude of the clock signal at each node (N2, N4, N5) on the clock trunk line 1 may be ½Vdd at the same time.

When the resistance values of the interconnection resistance R and the clamp resistance R3 are set at desired values, the amplitude of the clock signal at each of the terminal end node N5 and its reverse type terminal end node $\overline{N5}$ is the smallest, and the clock signals at both terminal end nodes N5 and $\overline{N5}$ are complementary type clock signals shown in clock waveforms CN5 and $\overline{CN5}$ in FIG. 14. These clock signals are both clocks vibrating on the central level of ½Vdd. The intermediate node N4 in FIG. 10 is at a position remote from the clamp resistance R3 by a certain distance, and is also close to the output node N2 of the differential output type clock driver D4. As a result of effect of the interconnection resistance R of the clock trunk line 1, the amplitude of the clock signal at the intermediate node N4 in FIG. 10 becomes larger than the clock amplitude at the terminal end node N5, and smaller than the clock amplitude at the output node N2 as shown in a clock waveform CN4 in FIG. 14. This clock signal also vibrates, due to the presence of the clamp resistance R3, complementarily on the central level of the inverted threshold of ½Vdd, same as the clock signals at the terminal end nodes N5 and $\overline{N5}$.

Figure 15:
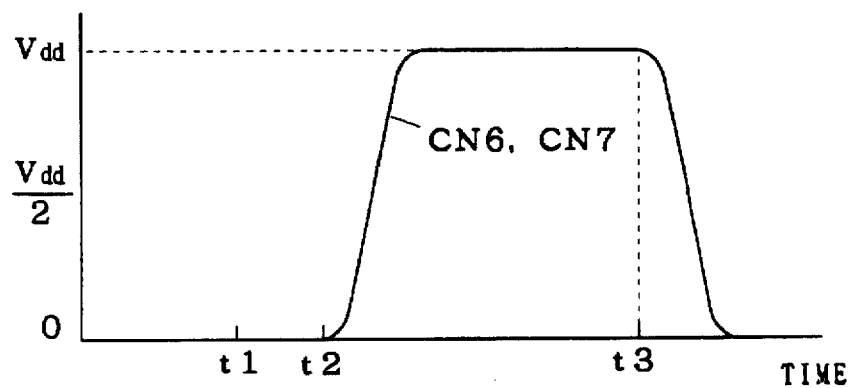
FIG. 15 is a diagram showing local driver output clock waveforms in the third to seventh preferred embodiments.

Herein, also, the inverted threshold of the first and second local drivers D2 and D3 is set at ½Vdd, the outputs of the first and second local drivers D2 and D3 are obtained as clocks shaped in waveform as shown in clock waveforms CN7 and CN6 in FIG. 15, respectively, and therefore the clock skew between the output nodes N6 and N7 is substantially decreased. Ideally, the clock skew may be said to be 0. The clock delay time from the output node N2 is also smaller as compared with the prior art.

The clamp resistance R3 in FIG. 10 is a passive element as described above, and is composed of, for example, a doped polysilicon used in forming the gate of the MOS transistor, an aluminum material used in the interconnection or the like. Therefore, to vary the resistance value of the clamp resistance R3, the size of the doped polysilicon or aluminum should be changed. Setting of the inverted threshold of the first and second local drivers D2, D3 can be realized by varying the size ratio of the P channel transistor and the N channel transistor for composing each local driver.

Not limited to the third preferred embodiment, in the fourth to eighth preferred embodiments to follow also, the clock trunk line 1 and the inverted clock trunk line $\overline{1}$ may be collectively called the clock trunk line for short. At this time, the clock trunk line 1 may be called a normal type clock trunk line, and the inverted clock trunk line $\overline{1}$ may be called a reverse type clock trunk line. Furthermore, the clock signal and the inverted clock signal may be collectively called the clock signal for short. At this time, the former may be called a normal type clock signal, and the latter, a reverse type clock signal.

(Fourth Preferred Embodiment)

Figure 16:
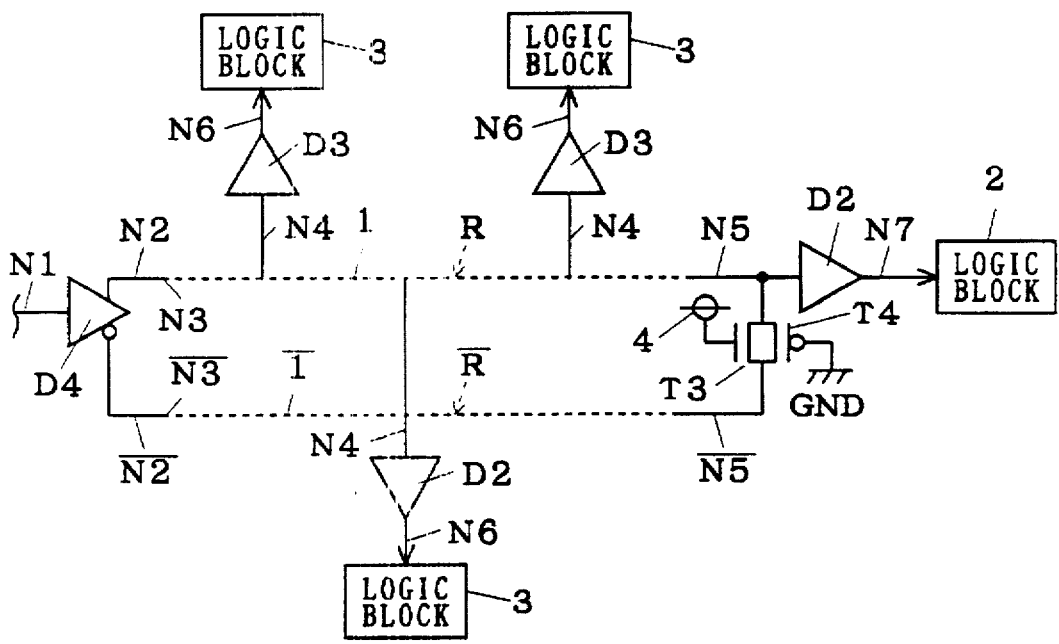
FIG. 16 is a block diagram showing the fourth preferred embodiment of the invention.
Figure 17:
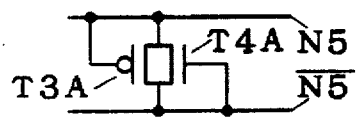
FIG. 17 is a diagram showing a modified example of the clamp transistor in the fourth preferred embodiment.
Figure 18:
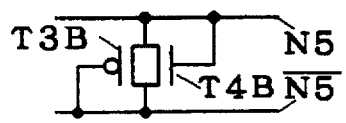
FIG. 18 is a diagram showing a modified example of the clamp transistor in the fourth preferred embodiment.
Figure 19:
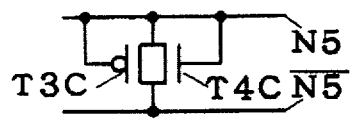
FIG. 19 is a diagram showing a modified example of the clamp transistor in the fourth preferred embodiment.
Figure 20:
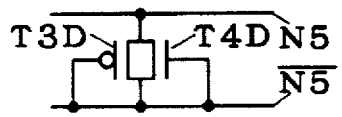
FIG. 20 is a diagram showing a modified example of the clamp transistor in the fourth preferred embodiment.
Figure 21:
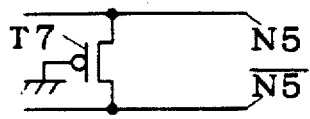
FIG. 21 is a diagram showing a modified example of the clamp transistor in the fourth preferred embodiment.
Figure 22:
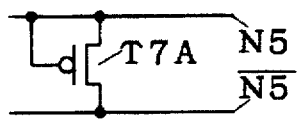
FIG. 22 is a diagram showing a modified example of the clamp transistor in the fourth preferred embodiment.
Figure 23:
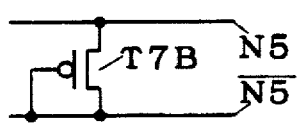
FIG. 23 is a diagram showing a modified example of the clamp transistor in the fourth preferred embodiment.
Figure 24:
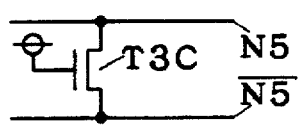
FIG. 24 is a diagram showing a modified example of the clamp transistor in the fourth preferred embodiment.
Figure 25:
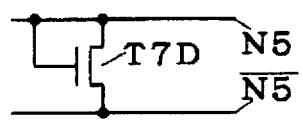
FIG. 25 is a diagram showing a modified example of the clamp transistor in the fourth preferred embodiment.
Figure 26:
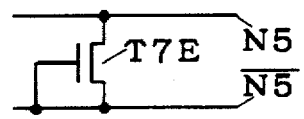
FIG. 26 is a diagram showing a modified example of the clamp transistor in the fourth preferred embodiment.

FIG. 16 is a block diagram showing the constitution of the clock distributing circuit in the fourth preferred embodiment of the present invention. In this fourth preferred embodiment, the clamp resistance R3 in the third preferred embodiment is replaced by an active element, that is, a MOS transistor, and the channel resistance value of the MOS transistor is utilized. In FIG. 16, constituent elements having the same reference numerals as in the third preferred embodiment are same in constitution and operation.

As shown in FIG. 16, between the terminal end node N5 remotest from the differential output type clock driver D4 and its inverted terminal node $\overline{N5}$, first and second MOS transistors T3 (n channel) and T4 (p channel) are provided as clamp transistors. That is, one semiconductor region of each of the first and second MOS transistors T3, T4 is connected to the terminal end node N5, the other semiconductor region of each of the both transistors T3, T4 is connected to the reverse type terminal end node $\overline{N5}$, a gate of the first MOS transistor T3 is connected to the supply potential node 4, and a gate of the second MOS transistor T4 is connected to the ground node GND.

Both clock signals at the terminal end node N5 and the terminal end node $\overline{N5}$ are complementary signals, and supposing the both to be clocks vibrating on the center of ½Vdd, the clamp level of each clock signal at both terminal end nodes N5, $\overline{N5}$ may be set at ½Vdd, only by forming the channel resistance (resistance body) realized by the clamp transistors (T3, T4) as described above. Accordingly, the inverted threshold of the first and second local drivers D2, D3 is set at ½Vdd. The driver D4 is set so that the central level of the amplitude of each of the clock signal and the inverted clock signal of the outputs of the differential output type clock driver D4 may be ½Vdd.

The clamp level can be changed to an arbitrary level only by varying the transistor ratio of the P and N channel transistors in the differential output type clock driver D4.

Furthermore, by varying the transistor size of the clamp transistor T3 or T4 and varying the interconnection resistance R of the clock trunk line 1, the transistor size and the interconnection resistance R are set so that the potential of ½ of the peak-to-peak voltage of the amplitude of the clock signal of each node (N2, N4, N5) on the clock trunk line becomes the inverted threshold, that is, ½Vdd at the same time, 1 may be the inverted threshold, or ½Vdd in this case, at the same time.

When the transistor size of the clamp transistors T3, T4 and the interconnection resistance R are both set at desired values, the clock waveform of the clock signal at each of the nodes N2, N4, N5 becomes as shown in FIG. 14, and the outputs of the first and second local drivers D2, D3 are obtained as waveform-shaped clocks as shown in clock waveforms CN7 and CN6 in FIG. 15. As a result, the clock skew between the both terminal end nodes N6 and N7 decreases (ideally 0). Besides, the clock delay time from the start end node N3 decreases notably.

The constitution of the clamp transistors T3, T4 is not limited to the one shown in FIG. 16, but it may be also realized by the connections shown in, for example, FIG. 17 to FIG. 26. In particular, in the constitutions shown in FIG. 16 to FIG. 20, the CMOS process can be applied, and it is advantageous in manufacture, and it is another benefit that the influence of threshold voltage Vth can be prevented by the combination of both transistors of p channel type and n channel type. In each constitution in FIG. 21 to FIG. 26, the clamp transistor is formed by only the transistor T7.

(Fifth Preferred Embodiment)

Figure 27:
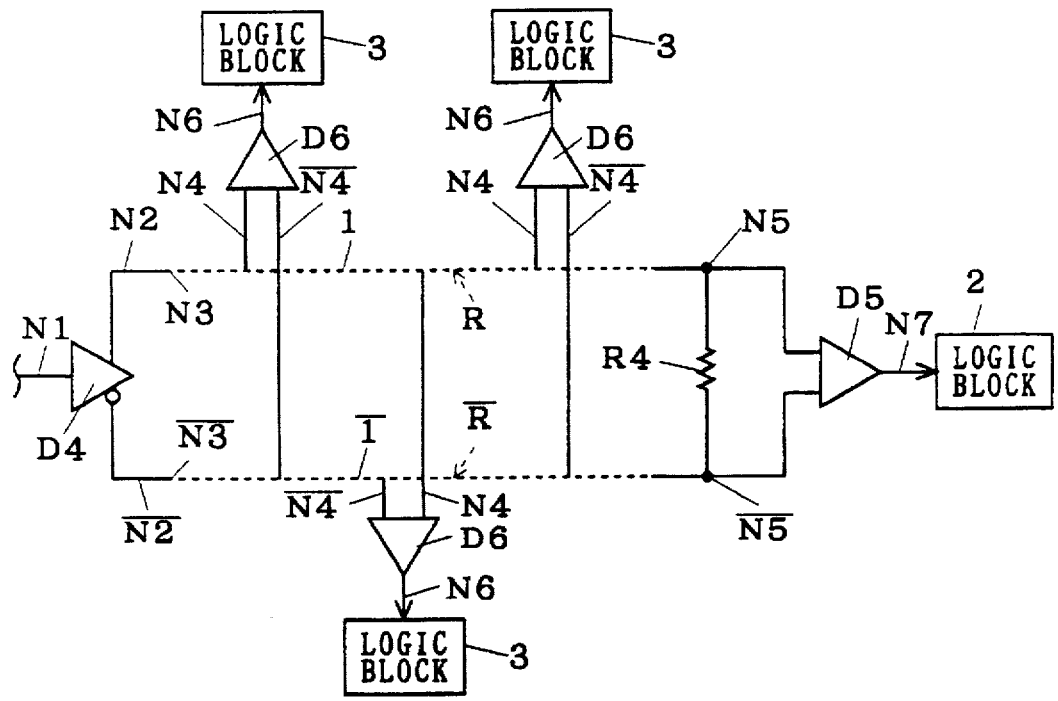
FIG. 27 is a block diagram showing the fifth preferred embodiment of the invention.

FIG. 27 is a block diagram showing the constitution of the block distributing circuit in the fifth preferred embodiment of the present invention. In the fifth preferred embodiment, the first and second local drivers D2, D3 shown in FIG. 10 of the third preferred embodiment are replaced by first and second local drivers D5, D6 of differential input type, respectively, and in other aspects it is basically same as in the fourth preferred embodiment. Therefore, the constituent elements except for the first and second local drivers D5, D6 are same in constitution and operation as the corresponding ones in the fourth preferred embodiment. A reference numeral $\overline{N4}$ denotes an intermediate node (inverted) of the inverted clock trunk line $\overline{1}$.

Figure 28:
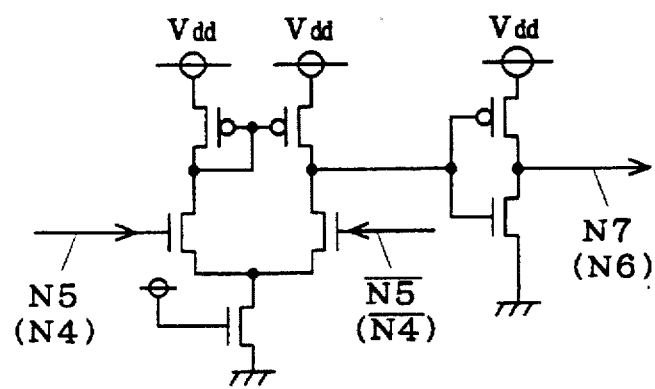
FIG. 28 a diagram showing a practical structure example of a differential input type local driver.

FIG. 28 shows a practical structural example of the first and second differential input type local drivers D5, D6 composed of a differential amplifier and a CMOS inverter.

In FIG. 27, a clamp resistance (or a resistance body) R3 is provided between the terminal end node N5 and its inverted terminal end node $\overline{N5}$ remotest from the differential output type clock driver D4. Both clock signals of the terminal end nodes N5 and $\overline{N5}$ are complementary signals, and supposing each to be a clock vibrating on the center of ½Vdd, the clamp level of the both clock signals can be set at ½Vdd only by installing a clamp resistance R4. Accordingly, the inverted threshold of the first and second differential input type local drivers D5, D6 is set at ½Vdd. The differential output type clock driver D4 is adjusted so that its outputs, that is, the clock signal and the inverted clock signal may both vibrate on the center of ½Vdd. To change the clamp level, the transistor ratio of each of the P and N channel transistors of the differential output type clock driver D4 is changed.

Moreover, by varying the resistance value of the clamp resistance R4 and varying the interconnection resistance R of the clock trunk line 1 and the interconnection resistance $\overline{R}$ of the inverted clock trunk line $\overline{1}$, the resistance values of the resistance body R4, and the interconnection resistances R and $\overline{R}$ are set so that the potential of ½ of the peak-to-peak voltage of the amplitude of the clock signal or the inverted clock signal at each node (N2, N4, N5, $\overline{N2}$, $\overline{N4}$, $\overline{N5}$) may be the inverted threshold, or ½Vdd in this case, at the same time.

When the interconnection resistances R and $\overline{R}$ and the clamp resistance R4 are set at desired values, the amplitudes of both clock signals of the terminal end node N5 and the terminal end node $\overline{N5}$ are the smallest, and the both clock signals are complementary clock signals as indicated as the clock waveforms CN5 and $\overline{CN5}$ in FIG. 14. Both clock signals are clocks vibrating on the center of ½Vdd. The amplitudes of the clock signals at the intermediate node N4 and the intermediate node $\overline{N4}$ are larger than the clock amplitudes of the terminal nodes N5 and $\overline{N5}$ and smaller than the clock amplitudes of the output node N2 and the inverted output node $\overline{N2}$, as indicated as the clock waveforms CN4 and $\overline{CN4}$ in FIG. 14, respectively. Since the inverted threshold of each of the first and second local drivers D5, D6 of differential input type is set at ½Vdd, the outputs of the first and second local drivers D5, D6 are obtained as waveform-shaped clocks as indicated by the clock waveforms CN7 and CN6 in FIG. 15, and hence the clock skew between the output nodes N6 and N7 decreases (ideally 0). Besides, the clock delay time from the output node N2 is notably smaller.

Furthermore, since the first and second local drivers D5, D6 are composed as differential input type, the effect of in-phase signal removal is obtained by the differential input, and hence the clock distributing circuit is resistant to the noise. Consequently, it is applicable to the recent low voltage trend in the semiconductor integrated circuit. At the same time, a favorable result is obtained for the temperature drift.

Incidentally, the clamp resistance R4 is a passive element, and it is composed of, for example, the doped polysilicon used in forming the gate of the MOS transistor, or the aluminum material used in the interconnection layer. Therefore, to vary the resistance value, it is enough to change the size of the doped polysilicon film or the aluminum film.

Setting of the inverted threshold of the first and second local drivers D5 and D6 of differential input type is realized by varying the size ratio of the N channel transistor and the N channel transistor for forming them.

(Sixth Preferred Embodiment)

Figure 29:
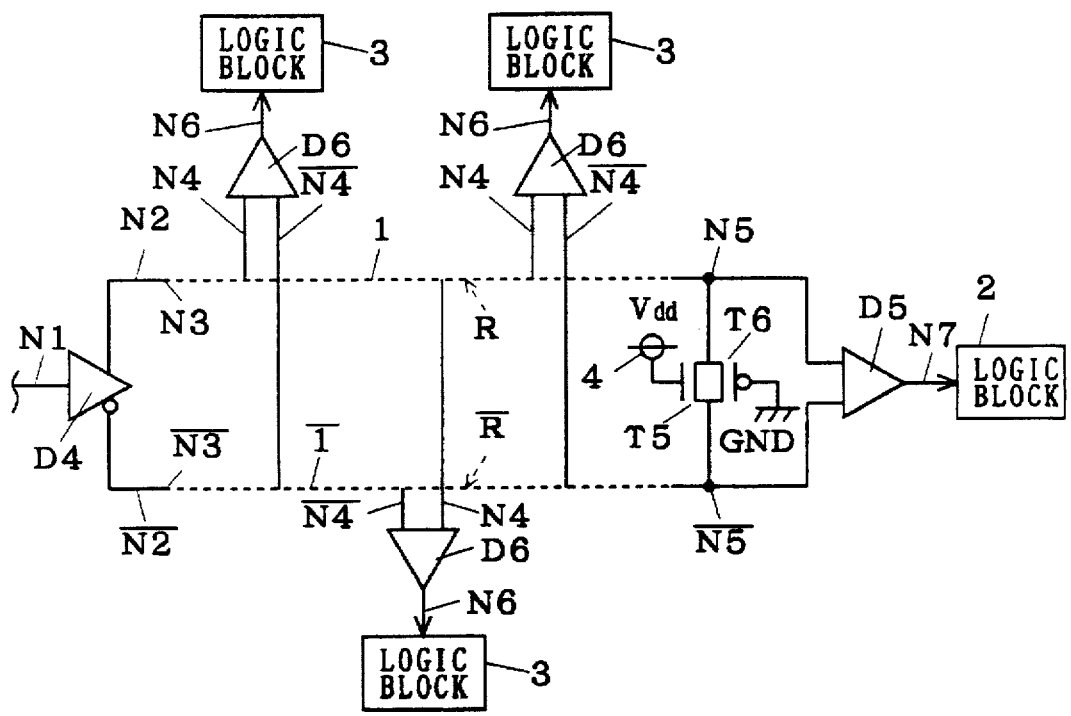
FIG. 29 is a block diagram showing the sixth preferred embodiment of the invention.

FIG. 29 is a block diagram showing the constitution of the clock distributing circuit in the sixth preferred embodiment of the present invention. In the sixth preferred embodiment, the clamp resistance R4 shown in FIG. 27 of the fifth preferred embodiment is replaced by the first and second MOS transistors T5, T6 as clamp transistors, and the channel resistances of the both clamp transistors T5, T61 are utilized. In FIG. 29, the constitution and operation of other components except the first and second MOS transistors T5, T6 are same as those of the corresponding components of the fifth preferred embodiment.

In FIG. 29, the clock signals of the terminal end node N5 and its inverted terminal end node $\overline{N5}$ remotest from the differential output type clock driver D4 are complementary signals, and supposing each to be a clock vibrating on the center of ½Vdd, the clamp level of the clock signal becomes ½Vdd only by forming the clamp transistors T5, T6. Accordingly, the inverted threshold of each of the first and second differential input type local drivers is set at ½Vdd. The differential output type clock driver D4 is also set so that the central level of each of the clock signal and the inverted clock signal may be ½Vdd.

To vary the clamp level, it is enough to change the transistor ratio of the P and N channel transistors of the differential output type driver D4.

Furthermore, by changing the transistor size of each of the clamp transistors T5 and T6, and varying the interconnection resistances R, $\overline{R}$ of the clock trunk line 1, and inverted clock trunk line $\overline{1}$, it is set so that the potential corresponding to ½ of the peak-to-peak voltage of the amplitude of the clock at each node (N2, N4, N5, $\overline{N2}$, $\overline{N4}$, $\overline{N5}$ may be ½Vdd at the same time.

When the clamp transistors T5, T6, and the interconnection resistances R, $\overline{R}$ are set at desired values, the amplitudes of the clock signal and the inverted clock signal at the terminal end node N5 and the terminal end node $\overline{N5}$, and the amplitudes of the clock signal and the inverted clock signal at the intermediate node N4 and the intermediate node $\overline{N4}$ are same as those in the fifth preferred embodiment. Therefore, the outputs of the first and second differential input type local drivers D5, D6 are obtained as waveform-shaped clocks as indicated by the clock waveforms CN7 and CN6 in FIG. 15, and therefore the clock skew between the output nodes N6 and N7 decreases, and the clock delay time from the output node N2 decreases. Moreover, the effect of in-phase signal removal by the differential input is obtained, and it is hence resistant to the noise same as in the fifth preferred embodiment, so that it is applicable to the low voltage (low power consumption) trend.

As the constitution of the clamp transistors T5, T6 in FIG. 29, it is also possible to constitute as shown in FIG. 17 to FIG. 27.

(Seventh Preferred Embodiment)

Figure 30:
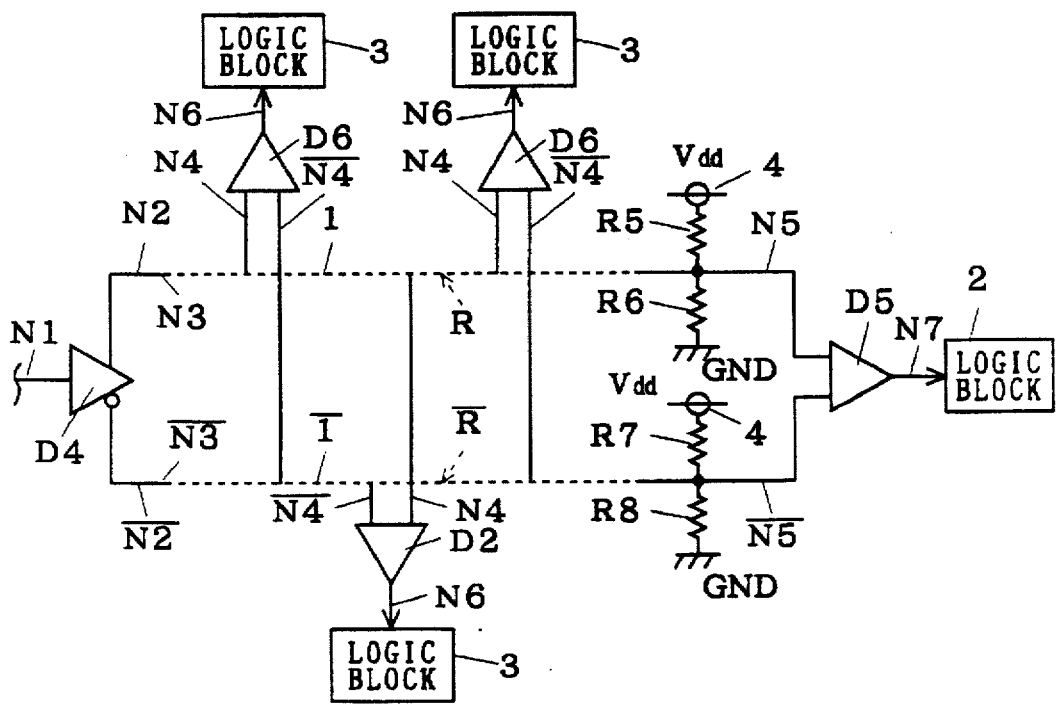
FIG. 30 is a block diagram showing the seventh preferred embodiment of the invention.

FIG. 30 is a block diagram showing the constitution of the clock distributing circuit in the seventh preferred embodiment of the present invention. In the seventh preferred embodiment, the clock distributing system in the first preferred embodiment is entirely replaced by the differential type.

In FIG. 30, the components are same as corresponding ones in FIG. 29, except for a resistance element R5 as a first resistance body, a resistance element R6 as a second resistance body, a resistance element R7 as a third resistance body, and a resistance element R8 as a fourth resistance body.

In FIG. 30, the resistance elements R5 and R6 are provided as clamp resistances in the terminal end node N5 remotest from the differential output type clock driver D4, and the resistance elements R7 and R8 are provided similarly as the clamp resistances at the inverted terminal node $\overline{N5}$. As a result, the complementary clock signals at the terminal end node N5 and the terminal end node $\overline{N5}$ are clamped at the inverted threshold, or ½Vdd herein, by the clamp resistances R5, R6 and the clamp resistances R7, R8, respectively. Herein, to vary the clamp level at the terminal end node N5, it is realized by changing the resistance ratio of the both resistance elements R5, R6, and change of the clamp level at the terminal end node $\overline{N5}$ is realized by varying the resistance ratio of the both terminal elements R7, R8. Or, alternatively, the transistor ratio of the P and N channel transistors in the differential output type clock driver D4 may be changed.

Furthermore, by changing the resistance values of the resistance elements R5, R6, R7, R8, and varying the interconnection resistances R, $\overline{R}$ of the clock trunk line 1 and the inverted clock trunk line $\overline{1}$, all the resistance values are set so that the potential of ½ of the peak-to-peak voltage of the amplitude of the clock on each node (N2, N4, N5, $\overline{N2}$, $\overline{N4}$, $\overline{N5}$) may be ½Vdd at the same time.

When the values of the resistance elements R5, R6, R7, R8, and the interconnection resistances R, $\overline{R}$ are set at desired values, the clock amplitudes at the terminal end node N5 and the terminal end node $\overline{N5}$ are the smallest, and become the complementary clock signals indicated as the clock waveforms CN5 and $\overline{CN5}$ in FIG. 14. These clock signals are both clocks vibrating about ½Vdd.

The amplitudes of clock signals at the intermediate node N4 and the intermediate node $\overline{N4}$ are larger than the clock amplitudes of the terminal end nodes N5, $\overline{N5}$, and smaller than the clock amplitudes at the clock driver output nodes N2, $\overline{N2}$, as indicated by the clock waveforms CN4, $\overline{CN4}$ in FIG. 14. These signals are both clocks vibrating complementarily about ½Vdd, same as the terminal end nodes N5, $\overline{N5}$.

Herein, since the inverted threshold of each of the first and second local drivers D5, D6 of the differential input type is set at ½Vdd, the outputs of the local drivers are obtained as waveform-shaped clocks, as indicated in the clock waveforms CN6 and CN7 in FIG. 15. As a result, the clock skew between the output nodes N6 and N7 decreases. The clock delay time from the output node N2 decreases. Moreover, as a result of the effect of in-phase signal removal by the differential input, the resistance to noise is enhanced.

In this seventh preferred embodiment, since the clamp level is adjusted by the resistance ratio in each trunk line, it is advantageous that the degree of freedom of the clamp level adjustment is large. This also holds true in the next eighth preferred embodiment.

(Eighth Preferred Embodiment)

Figure 31:
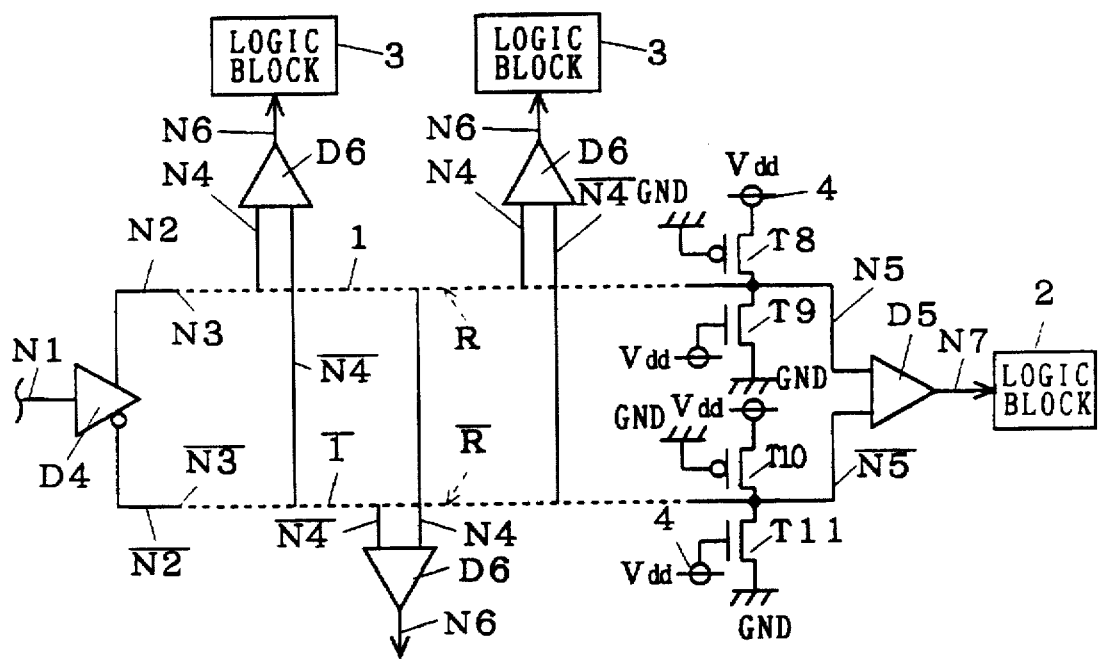
FIG. 31 is a block diagram showing the eighth preferred embodiment of the invention.
Figure 32:
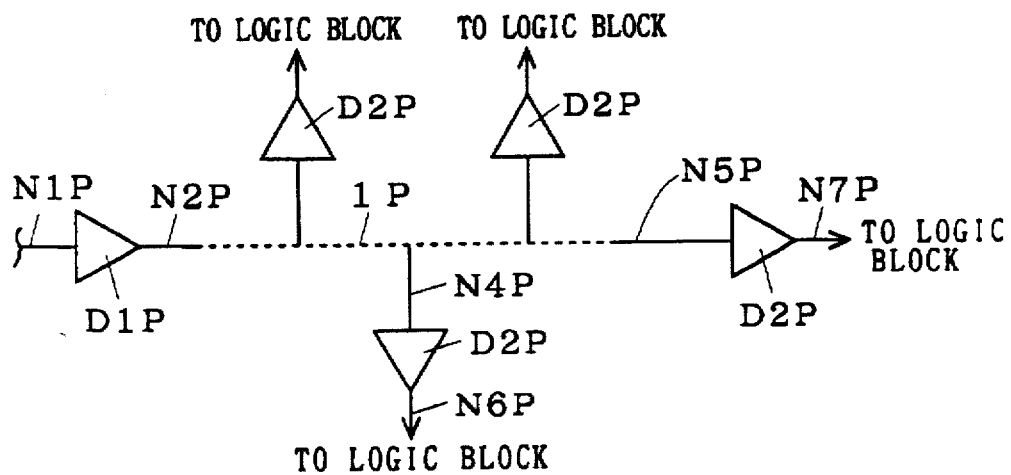
FIG. 32 is a block diagram showing a prior art.

FIG. 31 is a block diagram showing the constitution of the clock distributing circuit in the eighth preferred embodiment of the present invention. In this eighth preferred embodiment, the clamp resistances R5, R6, R7, R8 in the seventh preferred embodiment are replaced by MOS transistors T8, T9, T10, T11, respectively. Therefore, the channel resistances of the MOS transistors T8 to T11 are utilized.

In FIG. 31, the other parts are same as the corresponding parts in FIG. 30.

In FIG. 31, the clamp transistors T8, T9 are provided at the terminal end node N5 remotest from the differential output type clock driver D4, and the clamp transistors T10, T11, at the inverted terminal end node $\overline{N5}$. The complementary clock signals at the terminal end node N5 and the terminal end node $\overline{N5}$ are clamped at ½Vdd, respectively, by the clamp transistors T8, T9, and T10, T11. The clamp level of the terminal end node N5 can be changed by varying the transistor size of the clamp transistors T8, T9, and the clamp level of the terminal end node $\overline{B5}$ can be changed by varying the transistor size of the clamp transistors T10, T11. Or, alternatively, the transistor ratio of the P and N channel transistors in the differential output type clock driver D4 may be varied.

By varying each transistor size of the clamp transistors T8, T9, T10, T11, and varying the interconnection resistances R, $\overline{R}$, of the clock trunk line 1 and the inverted clock trunk line $\overline{1}$, the transistor size of the clamp transistors and the interconnection resistances R, $\overline{R}$, can be set so that the potential corresponding to ½ of the peak-to-peak voltage of the amplitude of the clock at each node (N2, N4, N5, $\overline{N2}$, $\overline{N4}$, $\overline{N5}$) may be ½Vdd at the same time.

When the clamp transistors T8, T9, T10, T11, and the interconnection resistances R, $\overline{R}$, are set at specified size, the clock waveform at each node is as shown in FIG. 14.

Supposing the inverted threshold of each of the first and second local drivers D5, D6 of the differential input type is set at ½Vdd, the outputs of the first and second local drivers D5, D6 are obtained as waveform-shaped clocks as shown by the clock waveforms CN7 and CN6 in FIG. 15, and the clock skew between the terminal end nodes N6, N7 decreases, the clock delay time from the output node N2 decreases, and the effect of in-phase signal removal by the differential input is obtained, so that the resistance to noise may be enhanced.

Figure 8:
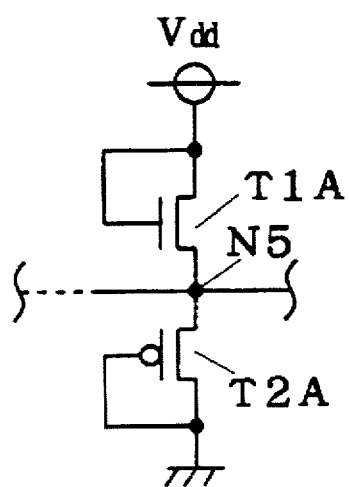
FIG. 8 is a diagram showing another modified example of a clamp transistor in the second preferred embodiment.
Figure 9:
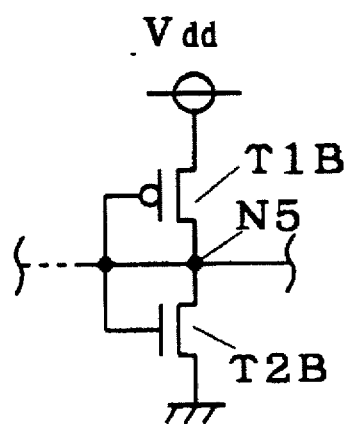
FIG. 9 is a diagram showing another modified example of the clamp transistor in the second preferred embodiment.

Incidentally, the clamp transistors T8, T9, T10, T11 in FIG. 31 may be also realized by the connections shown in FIG. 8 and FIG. 9.

As described herein, the clock signal is clamped at the inverted threshold of the first and second local drivers on the clock trunk line, and the clocks are supplied into the local drivers while increasing the clock amplitude on the node where the delay is small, and decreasing the clock amplitude on the node where the delay is large. By this construction, the clock delay between the clock driver and each local driver can be decreased, and the clock skew between the local drivers can be decreased at the same time.

While the invention has been shown and described in detail, the foregoing description is in all aspects illustrative and not restrictive. It is therefore understood that numerous modifications and variations can be devised without departing from the scope of the invention.

We claim:

1. A clock distributing circuit comprising:

a clock driver for receiving a source clock signal and outputting a clock signal;

a clock trunk line of which a start end node is connected to an output node of said clock driver, said clock trunk line being formed of a material having a resistance component;

a first local driver of which an input is connected to a terminal end node of said clock trunk line;

a second local driver of which an input node is connected to an intermediate node located between said start end node and said terminal end node of said clock trunk line;

a first resistance body of which one end is connected to said terminal end node and other end is connected to a supply potential node; and a second resistance body of which one end is connected to said terminal end node and other end is connected to a ground node, wherein said first and second local drivers have a same inverted threshold, a resistance ratio of said first resistance body and said second resistance body is set so that a potential corresponding to ½ of a peak-to-peak voltage of an amplitude of said clock signal at said terminal end node may be said inverted threshold, and a resistance value of said resistance component of said clock trunk line, and both resistance values of said first and second resistance bodies are set so that said potential corresponding to ½ of said peak-to-peak voltage of said amplitude of said clock signal at each one of said start end node, said intermediate node, and said terminal end node of said clock trunk line may be clamped at said inverted threshold at the same time.

2. A clock distributing circuit of claim 1, wherein said fist and second resistance bodies are both formed of passive elements.

3. A clock distributing circuit of claim 2, wherein said first and second resistance bodies are formed of the same as said material for forming said clock trunk line.

4. A clock distributing circuit of claim 1,
wherein said first and second resistance bodies are both formed of active elements.

5. A clock distributing circuit of claim 4,
wherein said active elements are MOS transistors, and channel resistance values of said MOS transistors are used as resistance values of said first and second resistance bodies.

6. A clock distributing circuit comprising:
a differential output type clock driver for receiving a source clock signal, and for outputting a clock signal and an inverted clock signal, which are mutually complementary signals, from an output node and an inverted output node, respectively;
a clock trunk line of which a start end node is connected to said output node of said differential output type clock drive, being formed of a material having a resistance component;
an inverted clock trunk line of which a start end node is connected to said inverted output node of said differential output type clock driver, being formed in a same condition as said clock trunk line, and of said material having said resistance component;
a first local driver of which an input is connected to a terminal end node of said clock trunk line;
a second local driver of which an input node is connected to an intermediate node located between said start end node and said terminal end node of said clock trunk line; and
a resistance body of which one end and other end are respectively connected to said terminal end node of said clock trunk line and a terminal end node of said inverted clock trunk line,
wherein said first and second local drivers have a same inverted threshold,
said clock signal and said inverted clock signal outputted by said differential output type clock driver both vibrate at said inverted threshold as a central value, and
a resistance value of said first resistance body and a resistance value of said resistance component of said clock trunk line are set so that a potential corresponding to ½ of a peak-to-peak voltage of an amplitude of said clock signal at each one of said start end node, said intermediate node, and said terminal end node of said clock trunk line may be clamped at said inverted threshold at the same time.

7. A clock distributing circuit of claim 6,
wherein said resistance body is formed of a passive element.

8. A clock distributing circuit of claim 7,
wherein said resistance body is formed of the same as said material for forming said clock trunk line and said inverted clock trunk line.

9. A clock distributing circuit of claim 6,
wherein said resistance body is formed of an active element.

10. A clock distributing circuit of claim 9,
wherein said active dement is a MOS transistor, and a channel resistance value of said MOS transistor is used as a resistance value of said resistance body.

11. A clock distributing circuit of claim 9,
wherein said active element comprises first and second MOS transistors,
one semiconductor region and other semiconductor region of said first MOS transistor are connected to said terminal end node of said clock trunk line and said terminal node of said inverted clock trunk line, respectively, and
one semiconductor region and other semiconductor region of said second MOS transistor are connected to said terminal end node of said clock trunk line and said terminal end node of said inverted clock trunk line, respectively.

12. A clock distributing circuit comprising:
a differential output type clock driver for receiving a source clock signal, and for outputting a clock signal and an inverted clock signal, which are mutually complementary signals, from an output node and an inverted output node, respectively;
a clock trunk line of which a start end node is connected to said output node of said differential output type clock drive, being formed of a material having a resistance component;
an inverted clock trunk line of which a start end node is connected to said inverted output node of said differential output type clock driver, being formed of said material having said resistance component so as to have a same interconnection length as said clock trunk line;
a first differential input type local driver of which one and other inputs are connected to a terminal end node of said clock trunk line and a terminal end node of said inverted clock trunk line, respectively;
a second differential input type local driver of which one and input nodes are connected to an intermediate node located between said start end node and said terminal end node of said clock trunk line and an intermediate node located between said start end node and said terminal end node of said inverted clock trunk line, respectively; and
a resistance body of which one end and other end are respectively connected to said terminal end node of said clock trunk line and said terminal end node of said inverted clock trunk line,
wherein said first and second differential input type local drivers have a same inverted threshold,
said clock signal and said inverted clock signal outputted by said differential output type clock driver both vibrate at said inverted threshold as a central value, and
a resistance value of said resistance body and both resistance values of said resistance components of said clock trunk line and said inverted clock trunk line are set so that a potential corresponding to ½ of a peak-to-peak voltage of an amplitude of said clock signal at each one of said start end nodes, said intermediate nodes, and said terminal end nodes of said clock trunk line and said inverted clock trunk line may be clamped at said inverted threshold at the same time.

13. A clock distributing circuit of claim 12,
wherein said resistance body is formed of a passive dement.

14. A clock distributing circuit of claim 13,
wherein said resistance body is formed of the same as said material for forming said clock trunk line and said inverted clock trunk line.

15. A clock distributing circuit of claim 12,
wherein said resistance body is formed of an active element.

16. A clock distributing circuit of claim 15,
wherein said active element is a MOS transistor, and a channel resistance value of said MOS transistor is used as a resistance value of said resistance body.

17. A clock distributing circuit of claim 16,
wherein said active element comprises first and second MOS transistors,
one semiconductor region and other semiconductor region of said first MOS transistor are connected to said terminal end node of said clock trunk line and said terminal node of said inverted clock trunk line, respectively, and one semiconductor region and other semiconductor region of said second MOS transistor are connected to said terminal end node of said clock trunk line and said terminal end node of said inverted clock trunk line, respectively.

18. A clock distributing circuit comprising:

a differential output type clock driver for receiving a source clock signal, and for outputting a clock signal and an inverted clock signal, which are mutually complementary signals, from an output node and an inverted output node, respectively;

a clock trunk line of which a start end node is connected to said output node of said differential output type clock drive, being formed of a material having a resistance component;

an inverted clock trunk line of which a start end node is connected to said inverted output node of said differential output type clock driver, being formed of said material having said resistance component so as to have a same interconnection length as said clock trunk line;

a first differential input type local driver of which one and other inputs are connected to a terminal end node of said clock trunk line and a terminal end node of said inverted clock trunk line, respectively;

a second differential input type local driver of which one and another input nodes are connected to an intermediate node located between said start end node and said terminal end node of said clock trunk line and an intermediate node located between said start end node and said terminal end node of said inverted clock trunk line, respectively;

a first resistance body of which one and another ends are connected to said terminal end node of said clock trunk line and a supply potential node, respectively;

a second resistance body of which one and another ends are connected to said terminal end node of said clock trunk line and a ground node, respectively;

a third resistance body of which one and another ends are connected to said terminal end node of said inverted clock trunk line and said supply potential node, respectively; and a fourth resistance body of which one and another ends are connected to said terminal end node of said inverted clock trunk line and said ground node, respectively;

wherein said first and second differential input type local drivers have a same inverted threshold;

a resistance ratio of said first resistance body and said second resistance body is set so that a potential corresponding to ½ of a peak-to-peak voltage of an amplitude of said clock signal at said terminal end node of said clock trunk line may be said inverted threshold;

a resistance ratio of said third resistance body and said fourth resistance body is set so that a potential corresponding to ½ of a peak-to-peak voltage of an amplitude of said inverted clock signal at said terminal end node of said inverted clock trunk line may be said inverted threshold;

a resistance value of said resistance component of said clock trunk line and both resistance values of said first and second resistance bodies are set so that said potential corresponding to ½ of said peak-to-peak voltage of said amplitude of said clock signal at each one of said start end node, said intermediate node, and said terminal end node of said clock trunk line may be clamped at said inverted threshold at the same time; and a resistance value of said resistance component of said inverted clock trunk line and both resistance values of said third and fourth resistance bodies are set so that said potential corresponding to ½ of said peak-to-peak voltage of said amplitude of said inverted clock signal at each one of said start end node, said intermediate node, and said terminal end node of said inverted clock trunk line may be clamped at said inverted threshold at the same time.

19. A clock distributing circuit of claim 18, wherein said first to fourth resistance bodies are formed of passive elements.

20. A clock distributing circuit of claim 18, wherein said first to fourth resistance bodies are formed of active elements.

21. A clock distributing circuit comprising:

a clock trunk line for transmitting a clock signal;

plural local drivers provided at an intermediate node and a terminal end node of said clock trunk line; and a resistance body provided at said terminal end node, wherein an interconnection resistance of said clock trunk line and a resistance value of said resistance body are set so that a potential corresponding to ½ of a peak-to-peak voltage of an amplitude of said clock signal at each one of a start end node, said intermediate node, and said terminal end node of said clock trunk line may be an inverted threshold of said local drivers at the same time.

22. A clock distributing circuit of claim 21, wherein said resistance body comprises a first resistance body provided between a supply potential node and said terminal end node, and a second resistance body provided between a ground node and said terminal end node.

23. A clock distributing circuit of claim 22, wherein said clock signal comprises a normal type clock signal and a reverse type clock signal, said clock trunk line comprises a normal type clock trunk line for transmitting said normal type clock signal, and a reverse type clock trunk line for transmitting said reverse type clock signal, said local drivers are differential input type local drivers for receiving said normal type clock signal on said normal type clock trunk line and said reverse type clock signal on said reverse type clock trunk line; and said resistance body is provided on both said normal type clock trunk line and said reverse type clock trunk line.

24. A clock distributing circuit of claim 21, wherein said clock signal comprises a normal type clock signal and a reverse type clock signal, said clock trunk line comprises a normal type clock trunk line for transmitting said normal type clock signal, and a reverse type clock trunk line for transmitting said reverse type clock signal, and said resistance body is provided between said terminal end node of said normal type clock trunk line and said terminal end node of said reverse type clock trunk line.

25. A clock distributing circuit of claim 24, wherein said local drivers are differential input type local drivers for receiving said normal type clock signal on said normal type clock trunk line and said reverse type clock signal on said reverse type clock trunk line.

* * * * *